US012315407B2

(12) United States Patent
Hong et al.

(10) Patent No.: US 12,315,407 B2
(45) Date of Patent: May 27, 2025

(54) METHOD OF INSPECTING DISPLAY APPARATUS AND APPARATUS FOR INSPECTING DISPLAY APPARATUS

(71) Applicant: Samsung Display Co., Ltd., Yongin-si (KR)

(72) Inventors: Jaechul Hong, Yongin-si (KR); Sungyong Byeon, Yongin-si (KR); Yoonsu Kang, Yongin-si (KR); Junhee Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 131 days.

(21) Appl. No.: 18/114,519

(22) Filed: Feb. 27, 2023

(65) Prior Publication Data

US 2023/0360568 A1 Nov. 9, 2023

(30) Foreign Application Priority Data

May 3, 2022 (KR) ........................ 10-2022-0055027

(51) Int. Cl.
*G09G 3/00* (2006.01)

(52) U.S. Cl.
CPC ......... *G09G 3/006* (2013.01); *G09G 2330/12* (2013.01)

(58) Field of Classification Search
CPC .... G09G 3/006; G09G 2330/12; G01R 31/00; G01R 19/00; G01R 31/2601; G01R 31/2635; G01R 31/2837; G01R 19/0092; G01R 31/2825; G01R 31/2839; G01R 31/2844; G01B 7/06; G01N 27/02
USPC .......................................................... 324/537
See application file for complete search history.

(56) References Cited

U.S. PATENT DOCUMENTS 8,004,677 B2 8/2011 Lee et al.
2006/0105475 A1* 5/2006 Ciplickas ........... G01R 31/2884 438/14
2011/0233547 A1* 9/2011 Song ....................... H01L 27/12 257/E23.179
2013/0127472 A1* 5/2013 Lee ......................... H01L 22/30 313/504
2015/0070617 A1* 3/2015 Lin .................. G02F 1/133345 349/43

(Continued)

FOREIGN PATENT DOCUMENTS

KR 2000-0014877 3/2000
KR 10-0742982 7/2007

(Continued)

*Primary Examiner* — Raul J Rios Russo
(74) *Attorney, Agent, or Firm* — KILE PARK REED & HOUTTEMAN PLLC

(57) ABSTRACT

A method of inspecting a display apparatus includes providing a display substrate including a substrate including a display area and a current inspection area, a first electrode and a second electrode that are disposed in the current inspection area and are apart from each other in a lengthwise direction of the substrate, and a first layer disposed in the current inspection area and electrically connecting the first electrode to the second electrode, and applying a first voltage and a second voltage to the first electrode and the second electrode, respectively, and measuring a current value flowing through the first layer.

20 Claims, 23 Drawing Sheets

(56) References Cited

U.S. PATENT DOCUMENTS

2017/0256324 A1* 9/2017 Kagami ........... G11C 29/56012
2020/0081039 A1* 3/2020 Kim ....................... G01R 31/50

FOREIGN PATENT DOCUMENTS

KR 10-2012-0038627 4/2012
KR 10-2141228 8/2020

* cited by examiner

METHOD OF INSPECTING DISPLAY APPARATUS AND APPARATUS FOR INSPECTING DISPLAY APPARATUS

CROSS-REFERENCE TO RELATED APPLICATION(S)

This application claims priority to and benefits of Korean Patent Application No. 10-2022-0055027 under 35 U.S.C. § 119, filed on May 3, 2022, in the Korean Intellectual Property Office (KIPO), the entire contents of which are incorporated herein by reference.

BACKGROUND

1. Technical Field

One or more embodiments relate to a method of inspecting a display apparatus and an apparatus for inspecting a display apparatus.

2. Description of the Related Art

A display apparatus may include a light-emitting element. As an example, a light-emitting element may be an organic light-emitting diode. An organic light-emitting diode may have a wide viewing angle, high contrast, high brightness, excellent driving voltage characteristics, and excellent response speed characteristics. The organic light-emitting diode may display multi-colors.

An organic light-emitting diode may include a pixel electrode, a hole transport layer, an emission layer, an electron transport layer, and an opposite electrode that are sequentially stacked. Holes injected from the pixel electrode may move to the emission layer through the hole transport layer, and electrons injected from the opposite electrode may move to the emission layer through the electron transport layer. Carriers such as holes and electrons may be recombined in the emission layer and generate excitons. In case that the excitons change from an excited state to a ground state, light may be generated.

SUMMARY

A layer of an organic light-emitting diode may include dopants, and a doping concentration of the layer may influence a light-emission quality of the organic light-emitting diode. For example, a thickness of the layer of the organic light-emitting diode may influence light-emission quality of the organic light-emitting diode. Accordingly, it may be important that the doping concentration or the thickness of the layer of the organic light-emitting diode is formed to have a certain value in a method of manufacturing a display apparatus.

One or more embodiments provide a method of inspecting a display apparatus that is capable of inspecting a doping concentration and a thickness of a layer of an organic light-emitting diode in a process of manufacturing the display apparatus.

One or more embodiments provide an apparatus for inspecting a display apparatus that is capable of inspecting a doping concentration and a thickness of a layer of an organic light-emitting diode in a process of manufacturing the display apparatus.

Additional aspects will be set forth in part in the description which follows and, in part, will be apparent from the description, or may be learned by practice of the embodiments.

According to one or more embodiments, a method of inspecting a display apparatus may include providing a display substrate including a substrate including a display area and a current inspection area, a first electrode and a second electrode that are disposed in the current inspection area and are apart from each other in a lengthwise direction of the substrate, and a first layer disposed in the current inspection area and electrically connecting the first electrode to the second electrode, applying a first voltage and a second voltage to the first electrode and the second electrode, respectively, and measuring a current value flowing through the first layer.

The method may further include calculating a doping concentration of dopants of the first layer based on the current value.

The method may further include calculating a thickness of the first layer based on the current value.

The providing of the display substrate may include forming the first electrode and the second electrode electrodes in the current inspection area, the first electrode and the second electrode being apart from each other, forming an insulating layer covering a first edge portion of the first electrode and a second edge portion of the second electrode, and forming the first layer on the first electrode, the insulating layer, and the second electrode, wherein the first layer may directly contact the first electrode and the second electrode.

The first electrode may include a plurality of first electrodes, the second electrode may include a plurality of second electrodes, the display substrate may further include a first pad and a second pad, the first pad may be electrically connected to the plurality of first electrodes, the second pad may be electrically connected to the plurality of second electrodes, and the current value flowing through the first layer may be measured by applying the first voltage and the second voltage to the first pad and the second pad, respectively.

The substrate may further include an optical inspection area, the display substrate may further include a second layer disposed on the first layer and having a thickness greater than a thickness of the first layer, a first optical inspection layer disposed in the optical inspection area, and a second optical inspection layer disposed on the first optical inspection layer and having a thickness greater than a thickness of the first optical inspection layer, the first layer and the first optical inspection layer may include a same material, the second layer and the second optical inspection layer may include a same material, and the method may further include optically measuring the thickness of the second optical inspection layer.

The substrate may further include an optical inspection area, the display substrate may further include an optical inspection layer disposed in the optical inspection area, and the method may further include optically measuring a thickness of the optical inspection layer.

The providing of the display substrate may include forming the first layer in the current inspection area, and forming a first display area layer in the display area, the first layer and the first display area layer may include a same material, and the method may further include adjusting a condition of a process of manufacturing the display apparatus based on the current value.

The first layer may include at least one of a hole injection layer, a hole transport layer, a negative charge-generating layer, a positive charge-generating layer, an electron injection layer, an emission layer, and an electron transport layer.

According to one or more embodiments, a method of inspecting a display apparatus may include providing a display substrate including a substrate including a display area and a current inspection area, a first electrode and a second electrode that are disposed in the current inspection area, a first layer disposed in the current inspection area and electrically connecting the first electrode to the second electrode, and a first display area layer disposed in the display area, the first display area layer and the first layer that include a same material, applying a first voltage and a second voltage to the first electrode and the second electrode, respectively, measuring a current value flowing through the first layer, and adjusting a condition of a process of manufacturing the display apparatus based on the current value, wherein the first electrode, the first layer, and the second electrode are sequentially disposed in a thickness direction of the substrate.

According to one or more embodiments, an apparatus for inspecting a display apparatus including a display substrate that includes a substrate including a display area, a current inspection area, and an optical inspection area, a first electrode and a second electrode that are disposed in the current inspection area, a first layer disposed in the current inspection area and electrically connecting the first electrode to the second electrode, a first optical inspection layer disposed in the optical inspection area, the first optical inspection layer and the first layer that include a same material, and a second optical inspection layer disposed on the first optical inspection layer, the apparatus for inspecting the display apparatus including a current inspector including a first module a first contact probe that is electrically connected to the first electrode; and a second contact probe that is electrically connected to the second electrode, and a first processing module that processes current data transferred from the first module, and an optical inspector including a second module including a light source that irradiates light toward the second optical inspection layer, and an optical detector that detects light reflected by the second optical inspection layer, and a second processing module that processes optical data of the reflected light transferred from the second module.

The current inspector may be configured to apply a first voltage and a second voltage to the first electrode and the second electrode, respectively, and to measure a current value flowing through the first layer, and the first processing module may calculate a doping concentration of dopants of the first layer based on the current value.

The current inspector may be configured to apply a first voltage and a second voltage to the first electrode and the second electrode, respectively and to measure a current value flowing through the first layer, and the first processing module may calculate a thickness of the first layer based on the current value.

The first electrode may be apart from the second electrode in a lengthwise direction of the substrate, the display substrate may further include an insulating layer covering a first edge portion of the first electrode and a second edge portion of the second electrode, and the first layer may be disposed on the first electrode, the insulating layer, and the second electrode, and may directly contact the first electrode and the second electrode.

The first electrode, the first layer, and the second electrode may be sequentially stacked in a thickness direction of the substrate.

A thickness of the second optical inspection layer may be greater than a thickness of the first optical inspection layer, and the second processing module may be configured to calculate the thickness of the second optical inspection layer based on the optical data.

The apparatus for inspecting the display apparatus may further include a controller that receives data from at least one of the current inspector and the optical inspector, wherein the display substrate may include a first display area layer disposed in the display area, the first display area layer and the first layer that include a same material, and the controller may be further configured to adjust a condition of a process of manufacturing the display apparatus based on the data.

The first layer may include at least one of a hole injection layer, a hole transport layer, a negative charge-generating layer, a positive charge-generating layer, an electron injection layer, an emission layer, and an electron transport layer.

The first module may be movable in one of a first direction, a second direction perpendicular to the first direction, and a third direction perpendicular to the first direction and the second direction.

The second module may be movable in one of a first direction, a second direction perpendicular to the first direction, and a third direction perpendicular to the first direction and the second direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1:
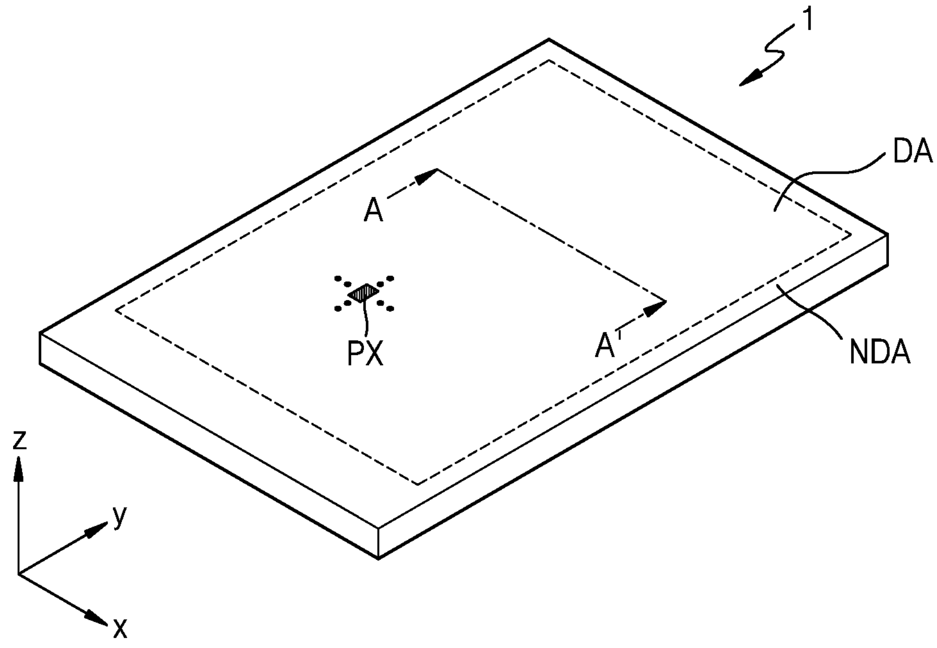
FIG. 1 is a schematic perspective view of a display apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, wherein like reference numerals refer to like elements throughout and a redundant description thereof is omitted.

While such terms as "first" and "second" may be used to describe various components, such components must not be limited to the above terms. The above terms are used to distinguish one component from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or components but do not preclude the addition of one or more other features or components.

It will be further understood that, in case that a layer, region, or component is referred to as being "on" another layer, region, or component, it can be directly or indirectly on the other layer, region, or component. For example, for example, intervening layers, regions, or components may be present.

Sizes of elements in the drawings may be exaggerated or reduced for convenience of explanation. As an example, the size and thickness of each element shown in the drawings are arbitrarily represented for convenience of description, and thus, the disclosure is not necessarily limited thereto.

In case that a certain embodiment may be implemented differently, a specific process order may be performed in the order different from the described order. As an example, two processes successively described may be simultaneously performed substantially and performed in the opposite order.

It will be understood that in case that a layer, region, or component is referred to as being "connected" to another layer, region, or component, it may be "directly connected" to the other layer, region, or component or may be "indirectly connected" to the other layer, region, or component with other layer, region, or component interposed therebetween. For example, it will be understood that in case that a layer, region, or component is referred to as being "electrically connected" to another layer, region, or component, it may be "directly electrically connected" to the other layer, region, or component or may be "indirectly electrically connected" to other layer, region, or component with other layer, region, or component interposed therebetween.

In the specification, "A and/or B" means A or B, or A and B. In the specification, "at least one of A and B" means A or B, or A and B.

A display apparatus may be used as a display screen of various products including televisions, notebook computers, monitors, advertisement boards, Internet of things (loT) devices as well as portable electronic apparatuses including mobile phones, smart phones, tablet personal computers (PC), mobile communication terminals, electronic organizers, electronic books, portable multimedia players (PMP), navigation devices, and ultra mobile personal computers (UMPC). For example, the display apparatus according to an embodiment may be used in wearable devices including smartwatches, watchphones, glasses-type displays, and head-mounted displays (HMD). For example, in an embodiment, the display apparatus may be used as instrument panels for automobiles, center fascias for automobiles, center information displays (CID) disposed on a dashboard, room mirror displays that replace side mirrors of automobiles, and displays disposed on the backside of front seats as an entertainment for back seats of automobiles.

FIG. 1 is a schematic perspective view of a display apparatus 1 according to an embodiment.

Referring to FIG. 1, the display apparatus 1 may display images. The display apparatus 1 may include a display area DA and a non-display area NDA. A pixel PX may be arranged in the display area DA. The non-display area NDA may surround at least a portion of the display area DA. A pixel PX may not be arranged in the non-display area NDA.

Though FIG. 1 shows the display apparatus 1 in which the display area DA is rectangular, the display area DA may be circles, ellipses, or other polygons such as triangles or pentagons. For example, though FIG. 1 shows the display apparatus 1 as a flat display apparatus having a flat shape, the display apparatus 1 may be implemented in various shapes such as flexible, foldable, and rollable display apparatuses.

The pixel PX may include pixels PX. The pixels PX may be arranged in the display area DA. The pixels PX may emit light, and the display apparatus 1 may display images in the display area DA. In an embodiment, each of the pixels PX may emit red light, green light, or blue light. In an embodiment, each of the pixels PX may emit red light, green light, blue light, or white light.

A pixel PX may include a light-emitting element. In an embodiment, the light-emitting element may be an organic light-emitting diode including an organic emission layer. In another example, the light-emitting element may be a light-emitting diode LED including an inorganic emission layer. The size of the light-emitting diode LED may be in the range of microscale or nanoscale. As an example, the light-emitting diode may be a micro light-emitting diode. In another example, the light-emitting diode may be a nanorod light-emitting diode. The nanorod light-emitting diode may include gallium nitride (GaN). In an embodiment, a color-converting layer may be disposed on the nano-rod light-emitting diode. The color-converting layer may include quantum dots. In another example, the light-emitting element may be a quantum-dot light-emitting diode including a quantum-dot emission layer. Hereinafter, the case where a light-emitting element is an organic light-emitting diode is described in detail for descriptive convenience.

Figure 2:
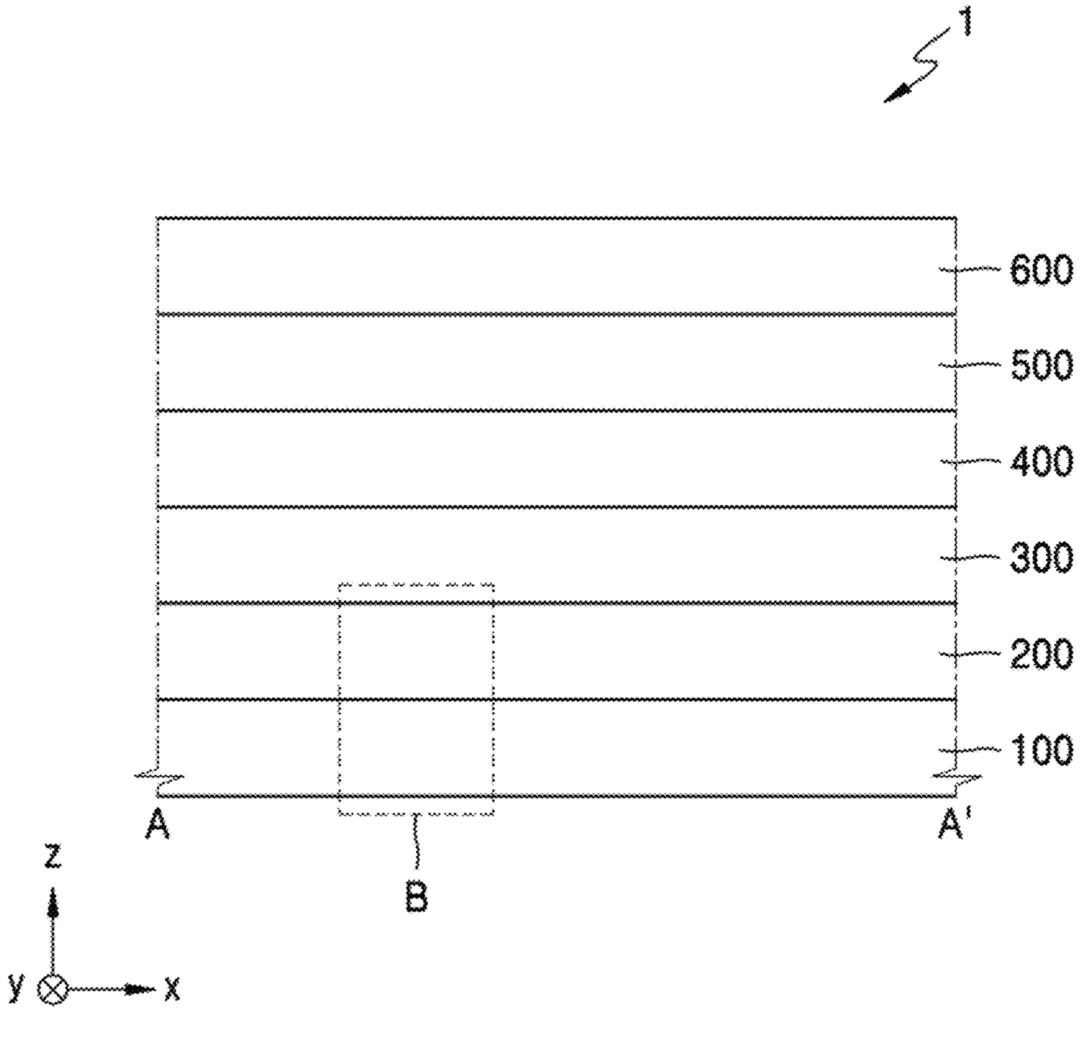
FIG. 2 is a schematic cross-sectional view taken along line A-A' illustrating the display apparatus of FIG. 1.

FIG. 2 is a schematic cross-sectional view taken along line A-A' illustrating the display apparatus 1 of FIG. 1.

Referring to FIG. 2, the display apparatus 1 may include a substrate 100, a display layer 200, an encapsulation layer 300, a touch sensor layer 400, an optical functional layer 500, and a window 600. The substrate 100 may include glass or a polymer resin such as polyethersulfone, polyarylate, polyetherimide, polyethylene naphthalate, polyethylene terephthalate, polyphenylene sulfide, polyimide, polycarbonate, cellulose tri acetate, cellulose acetate propionate, and the like. In an embodiment, the substrate 100 may have a multi-layered structure including a base layer including the above polymer resin and a barrier layer. The substrate 100 including the polymer resin is flexible, rollable, or bendable.

The display layer 200 may be disposed on the substrate 100. The display layer 200 may include a pixel circuit layer including a pixel circuit, and a light-emitting element layer including a light-emitting element. The pixel circuit may include at least one transistor and at least one storage capacitor.

The encapsulation layer 300 may be disposed on the display layer 200. The encapsulation layer 300 may be disposed on the light-emitting element and may cover the light-emitting element. In an embodiment, the encapsulation layer 300 may include at least one inorganic encapsulation layer and at least one organic encapsulation layer. The at least one inorganic encapsulation layer may include at least one inorganic material among aluminum oxide ($Al_2O_3$), titanium oxide ($TiO_2$), tantalum oxide ($Ta_2O_5$), zinc oxide ($ZnO_x$), silicon oxide ($SiO_2$), silicon nitride ($SiN_x$), and silicon oxynitride (SiON). Zinc oxide ($ZnO_x$) may be zinc oxide (ZnO) and/or zinc peroxide ($ZnO_2$). The at least one organic encapsulation layer may include a polymer-based material. The polymer-based material may include an acryl-based resin, an epoxy-based resin, polyimide, and polyethylene. In an embodiment, the at least one organic encapsulation layer may include acrylate. In an embodiment, the encapsulation layer 300 may include a sealing substrate. The sealing substrate may seal the light-emitting element in cooperation with a sealing member arranged in the non-display area NDA.

The touch sensor layer 400 may be disposed on the encapsulation layer 300. The touch sensor layer 400 may obtain (or collect) coordinate information corresponding to an external input, for example, a touch event. The touch sensor layer 400 may include a sensor electrode and touch lines connected to the sensor electrode. The touch sensor layer 400 may sense an external input by using a self-capacitance method or a mutual capacitance method. The touch sensor layer 400 may be disposed on the encapsulation layer 300. In another example, the touch sensor layer 400 may be separately formed on a touch substrate and coupled to the encapsulation layer 300 through an adhesive layer such as an optically clear adhesive. In an embodiment, the touch sensor layer 400 may be formed (e.g., directly formed) on the encapsulation layer 300. For example, the adhesive layer may not be disposed between the touch sensor layer 400 and the encapsulation layer 300.

The optical functional layer 500 may be disposed on the touch sensor layer 400. The optical functional layer 500 may reduce reflectivity of light (e.g., external light) incident toward the display apparatus 1 from outside. The optical functional layer 500 may increase color purity of light emitted from the display apparatus 1. In an embodiment, the optical functional layer 500 may include a retarder and/or a polarizer. The retarder may include a film-type retarder or a liquid crystal-type retarder. The retarder may include a $\lambda/2$ retarder and/or a $\lambda/4$ retarder. The polarizer may include a film-type polarizer or a liquid crystal-type polarizer. The film-type polarizer may include a stretched synthetic resin film, and the liquid crystal-type polarizer may include liquid crystals arranged in a certain pattern. Each of the retarder and the polarizer may further include a protective film.

In an embodiment, optical functional layer 500 may include a black matrix and color filters. The color filters may be arranged by taking into account colors of light emitted respectively from the pixels of the display apparatus 1. The color filters may each include red, green, or blue pigment or dye. In another example, the color filters may each further include quantum dots in addition to the pigment or dye. In another example, some of the color filters may not include pigment or dye, and may include scattering particles such as titanium oxide.

In an embodiment, the optical functional layer 500 may include a destructive interference structure. The destructive interference structure may include a first reflection layer and a second reflection layer respectively disposed on different layers. First-reflected light and second-reflected light respectively reflected by the first reflection layer and the second reflection layer may destructively interfere, and thus, the reflectivity of external light may be reduced.

The window 600 may be disposed on the optical functional layer 500. The window 600 may protect elements disposed under the window 600. The window 600 may include at least one of glass, sapphire, and plastic. The window 600 may be, for example, ultra-thin glass or colorless polyimide.

Figure 3:
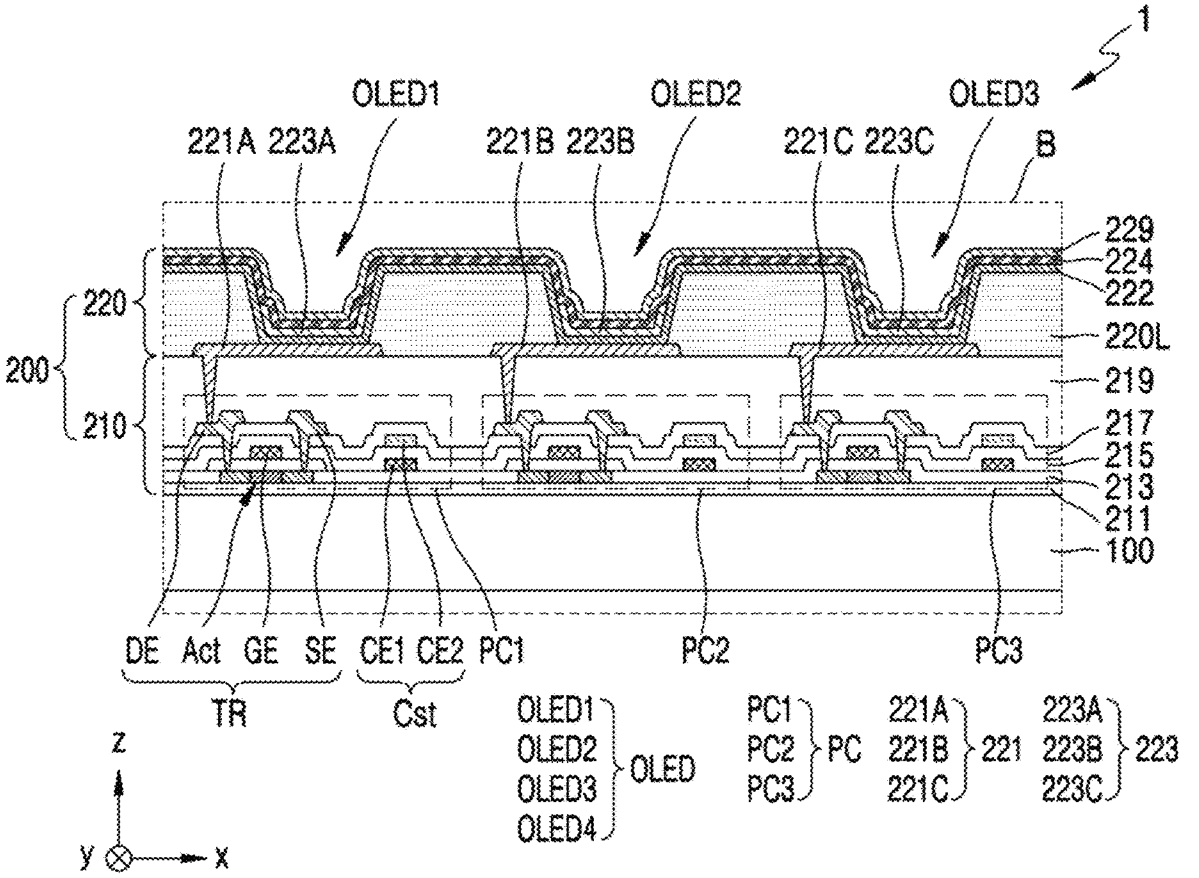
FIG. 3 is a schematic enlarged view of a region B of the display apparatus of FIG. 2 according to an embodiment.

FIG. 3 is a schematic enlarged view of a region B of the display apparatus 1 of FIG. 2 according to an embodiment. In FIG. 3, the same reference numerals as those of FIG. 2 denote the same members, and thus, redundant descriptions thereof are omitted for descriptive convenience.

Referring to FIG. 3, the display apparatus 1 may include the substrate 100 and the display layer 200. The display layer 200 may be disposed on the substrate 100. The display layer 200 may include a pixel circuit layer 210 and a light-emitting element layer 220. The pixel circuit layer 210 may include a buffer layer 211, a first gate insulating layer 213, a second gate insulating layer 215, an interlayer insulating layer 217, a pixel circuit PC, and an organic insulating layer 219.

The buffer layer 211 may be disposed on the substrate 100. The buffer layer 211 may include an inorganic insulating material such as silicon nitride ($SiN_x$), silicon oxynitride (SiON), and silicon oxide ($SiO_2$), and include a single layer or a multi-layer including the inorganic insulating materials.

The pixel circuit PC may be disposed on the buffer layer 211. In an embodiment, the pixel circuit PC may include a first pixel circuit PC1, a second pixel circuit PC2, and a third pixel circuit PC3. The pixel circuit PC may include at least one transistor TR and at least one storage capacitor Cst. The at least one transistor TR may include a semiconductor layer Act, a gate electrode GE, a source electrode SE, and a drain electrode DE. The at least one storage capacitor Cst may include a first capacitor electrode CE1 and a second capacitor electrode CE2.

The semiconductor layer Act may be disposed on the buffer layer 211. The semiconductor layer Act may include polycrystalline silicon. In another example, the semiconductor layer Act may include amorphous silicon, an oxide semiconductor, or an organic semiconductor. In an embodiment, the semiconductor layer Act may include a channel region, a drain region, and a source region, the drain region and the source region being on two opposite sides of the channel region.

The first gate insulating layer 213 may be disposed on the semiconductor layer Act and the buffer layer 211. The first gate insulating layer 213 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). Zinc oxide ($ZnO_x$) may include zinc oxide (ZnO) and/or zinc peroxide ($ZnO_2$).

The gate electrode GE may be disposed on the first gate insulating layer 213. The gate electrode GE may overlap the channel region of the semiconductor layer Act. The gate electrode GE may include a low-resistance metal material.

The gate electrode GE may include a conductive material including molybdenum (Mo), aluminum (Al), copper (Cu), and titanium (Ti) and include a single layer or a multi-layer including the above materials.

The first capacitor electrode CE1 may be disposed on the first gate insulating layer 213. The first capacitor electrode CE1 may include a low-resistance metal material. The first capacitor electrode CE1 may include a conductive material including molybdenum (Mo), aluminum (Al), copper (Cu), and titanium (Ti) and include a single layer or a multi-layer including the above materials. The gate electrode GE and the first capacitor electrode CE1 may be formed by the same process and may include the same material.

The second gate insulating layer 215 may be disposed on the gate electrode GE, the first capacitor electrode CE1, and the first gate insulating layer 213. The second gate insulating layer 215 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$).

The second capacitor electrode CE2 may be disposed on the second gate insulating layer 215. The second capacitor electrode CE2 may overlap the first capacitor electrode CE1 with the second gate insulating layer 215 therebetween. The first capacitor electrode CE1 and the second capacitor electrode CE2 may constitute the storage capacitor Cst. Though it is shown that the transistor TR does not overlap the storage capacitor Cst, the transistor TR may overlap the storage capacitor Cst in an embodiment. For example, the gate electrode GE and the first capacitor electrode CE1 may be provided as one body (or integral with each other). The second capacitor electrode CE2 may include aluminum (Al), platinum (Pt), palladium (Pd), silver (Ag), magnesium (Mg), gold (Au), nickel (Ni), neodymium (Nd), iridium (Ir), chrome (Cr), calcium (Ca), molybdenum (Mo), titanium (Ti), tungsten (W), and/or copper (Cu), and include a single layer or a multi-layer including the above materials.

The interlayer insulating layer 217 may be disposed on the second capacitor electrode CE2 and the second gate insulating layer 215. The interlayer insulating layer 217 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$).

The source electrode SE and the drain electrode DE may be disposed on the interlayer insulating layer 217. The source electrode SE and the drain electrode DE may each be connected to the semiconductor layer Act through a contact hole formed in the first gate insulating layer 213, the second gate insulating layer 215, and the interlayer insulating layer 217. At least one of the source electrode SE and the drain electrode DE may include a conductive material including molybdenum (Mo), aluminum (Al), copper (Cu), and titanium (Ti) and include a single layer or a multi-layer including the above materials. At least one of the source electrode SE and the drain electrode DE may have a multi-layered structure of Ti/Al/Ti.

The organic insulating layer 219 may be disposed on the source electrode SE, the drain electrode DE, and the interlayer insulating layer 217. The organic insulating layer 219 may include an organic material. The organic insulating layer 219 may include an organic insulating material including a general-purpose polymer such as polymethylmethacrylate (PMMA) or polystyrene (PS), polymer derivatives having a phenol-based group, an acryl-based polymer, an imide-based polymer, an aryl ether-based polymer, an amide-based polymer, a fluorine-based polymer, a p-xylene-based polymer, a vinyl alcohol-based polymer, or a blend (or a combination) thereof.

The light-emitting element layer 220 may be disposed on the organic insulating layer 219. The light-emitting element layer 220 may include a light-emitting element. In an embodiment, the light-emitting element layer 220 may include an organic light-emitting diode OLED and a pixel-defining layer 220L. The organic light-emitting diode OLED may include a pixel electrode 221, a first functional layer 222, an emission layer 223, a second functional layer 224, and an opposite electrode 229.

The pixel electrode 221 may be disposed on the organic insulating layer 219. The pixel electrode 221 may be connected (e.g., electrically connected) to the transistor TR through a contact hole of the organic insulating layer 219. In an embodiment, the pixel electrode 221 may include a first pixel electrode 221A, a second pixel electrode 221B, and a third pixel electrode 221C. The pixel electrode 221 may include a conductive oxide such as indium tin oxide (ITO), indium zinc oxide (IZO), zinc oxide (ZnO), indium oxide ($In_2O_3$), indium gallium oxide (IGO), or aluminum zinc oxide (AZO). In an embodiment, the pixel electrode 221 may include a reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof. In an embodiment, the pixel electrode 221 may further include a layer on/under the reflective layer, the layer including ITO, IZO, ZnO, or $In_2O_3$. As an example, the pixel electrode 221 may have a multi-layered structure of ITO/Ag/ITO.

The pixel-defining layer 220L may cover the edge portion of the pixel electrode 221. The pixel-defining layer 220L may include an opening. The opening may expose the central portion of the pixel electrode 221. The opening may define an emission area of light emitted from the organic light-emitting diode OLED. In an embodiment, the pixel-defining layer 220L may include an organic material and/or an inorganic material. In an embodiment, the pixel-defining layer 220L may be transparent. In an embodiment, the pixel-defining layer 220L may include a black matrix. For example, the pixel-defining layer 220L may be opaque (or a light blocking layer).

The first functional layer 222 may be disposed on the pixel electrode 221 and the pixel-defining layer 220L. In an embodiment, the first functional layer 222 may be continuously disposed on the pixel electrode 221 and the pixel-defining layer 220L. In an embodiment, the first functional layer 222 may include a hole transport layer (HTL), or include an HTL and a hole injection layer (HIL).

The emission layer 223 may be disposed on the first functional layer 222. The emission layer 223 may overlap the pixel electrode 221. The emission layer 223 may include a polymer organic material or a low-molecular weight organic material emitting light having a certain color. In an embodiment, the emission layer 223 may include a first emission layer 223A, a second emission layer 223B, and a third emission layer 223C. The first emission layer 223A may overlap the first pixel electrode 221A. The second emission layer 223B may overlap the second pixel electrode 221B. The third emission layer 223C may overlap the third pixel electrode 221C. In an embodiment, the first emission layer 223A may emit red light, the second emission layer 223B may emit green light, and the third emission layer 223C may emit blue light. In an embodiment, the first emission layer 223A may include red dopants, the second emission layer 223B may include green dopants, and the third emission layer 223C may include blue dopants.

The second functional layer 224 may be disposed on the emission layer 223 and the first functional layer 222. In an embodiment, the second functional layer 224 may extend (e.g., continuously extend) on the emission layer 223 and the first functional layer 222. The second functional layer 224 may include an electron transport layer (ETL) and/or an electron injection layer (EIL).

The opposite electrode 229 may be disposed on the second functional layer 224. The opposite electrode 229 may include a conductive material having a low work function. As an example, the opposite electrode 229 may include a (semi) transparent layer including silver (Ag), magnesium (Mg), aluminum (Al), platinum (Pt), palladium (Pd), gold (Au), nickel (Ni), neodymium (Nd), iridium (Ir), chrome (Cr), or an alloy thereof. In another example, the opposite electrode 229 may further include a layer, which includes ITO, IZO, ZnO, or $In_2O_3$, on the (semi) transparent layer.

In an embodiment, a capping layer may be further disposed on the opposite electrode 229. The capping layer may include an inorganic material such as lithium fluoride (LiF), and/or an organic material.

The first pixel electrode 221A, the first functional layer 222, the first emission layer 223A, the second functional layer 224, and the opposite electrode 229, which are sequentially stacked, may constitute a first organic light-emitting diode OLED1. The second pixel electrode 221B, the first functional layer 222, the second emission layer 223B, the second functional layer 224, and the opposite electrode 229, which are sequentially stacked, may constitute a second organic light-emitting diode OLED2. The third pixel electrode 221C, the first functional layer 222, the third emission layer 223C, the second functional layer 224, and the opposite electrode 229, which are sequentially stacked, may constitute a third organic light-emitting diode OLED3.

Figure 4:
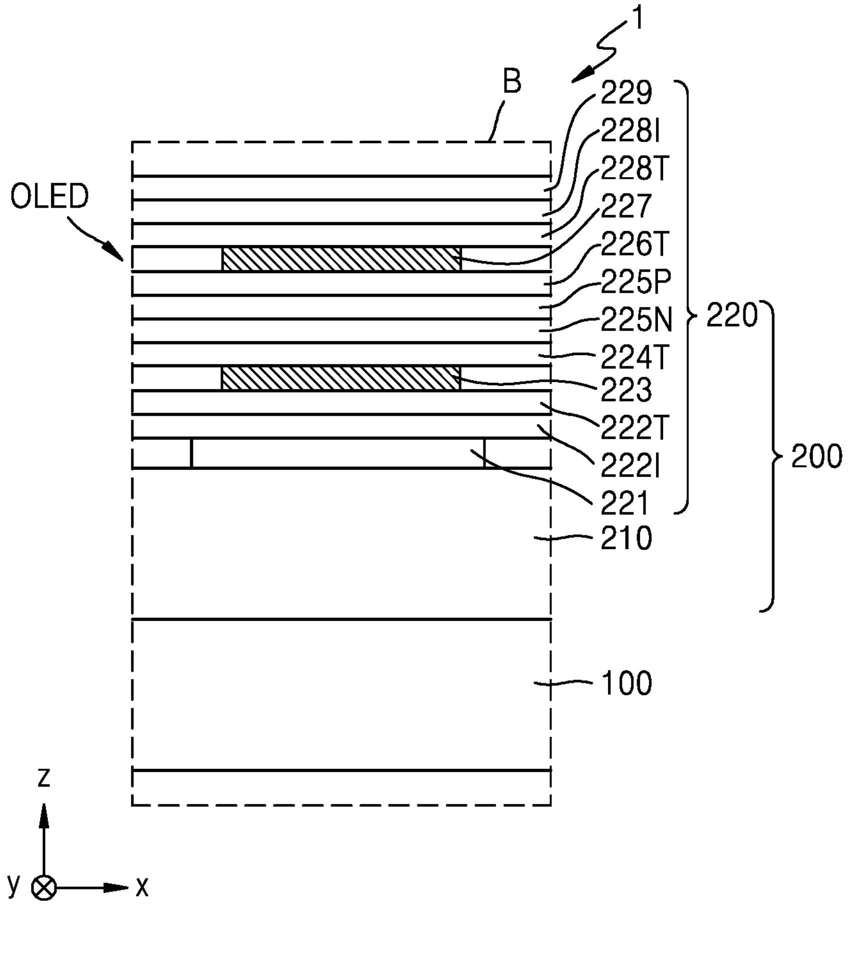
FIG. 4 is a schematic enlarged view of a region B of the display apparatus of FIG. 2 according to an embodiment.

FIG. 4 is a schematic enlarged view of a region B of the display apparatus 1 of FIG. 2 according to an embodiment. In FIG. 4, the same reference numerals as those of FIG. 3 denote the same members, and thus, redundant descriptions thereof are omitted for descriptive convenience.

Referring to FIG. 4, the display apparatus 1 may include the substrate 100 and the display layer 200. The display layer 200 may include a pixel circuit layer 210 and a light-emitting element layer 220. The light-emitting element layer 220 may include a light-emitting element. In an embodiment, the light-emitting element layer 220 may include an organic light-emitting diode OLED. The organic light-emitting diode OLED may include the pixel electrode 221, a hole injection layer 2221, a first hole transport layer 222T, an emission layer 223, a first electron transport layer 224T, a negative charge-generating layer 225N, a positive charge-generating layer 225P, a second hole transport layer 226T, an additional emission layer 227, a second electron transport layer 228T, an electron injection layer 2281, and the opposite electrode 229.

The hole injection layer 2221 may be disposed on the pixel electrode 221. The hole injection layer 2221 may swiftly inject holes. The hole injection layer 2221 may include hosts and dopants. In an embodiment, the host may include an organic material. The dopants may include a metal material. In an embodiment, the hole injection layer 2221 may include p-dopant hole injection layer (p-HIL) doped with p-type dopants. In an embodiment, the hole injection layer 2221 may include layers. As an example, the hole injection layer 2221 may include a first hole injection layer doped with p-type dopants and a second hole injection layer including hosts.

The first hole transport layer 222T may be disposed on the hole injection layer 2221. The first hole transport layer 222T may move holes transferred from the pixel electrode 221 to the emission layer 223, and bind electrons transferred from the negative charge-generating layer 225N to the emission layer 223. In an embodiment, the hole injection layer 2221 and the first hole transport layer 222T may constitute the first functional layer 222 of FIG. 3.

The emission layer 223 may be disposed on the first hole transport layer 222T. Carriers such as holes and electrons may be recombined in the emission layer 223, and excitons may be created. In case that the excitons change from an excited state to a ground state, light may be generated.

The first electron transport layer 224T may be disposed on the emission layer 223. The first electron transport layer 224T may transport electrons transferred from the negative charge-generating layer 225N to the emission layer 223. In an embodiment, the first electron transport layer 224T may include a mixture of at least two materials. In an embodiment, the first electron transport layer 224T may include a buffer layer including an electron transport compound.

The negative charge-generating layer 225N may be disposed on the first electron transport layer 224T. The negative charge-generating layer 225N may supply electrons to the emission layer 223. In an embodiment, the negative charge-generating layer 225N may be an n-type charge-generating layer. The negative charge-generating layer 225N may include hosts and dopants. In an embodiment, the host may include an organic material. The dopant may include a metal material.

The positive charge-generating layer 225P may be disposed on the negative charge-generating layer 225N. The positive charge-generating layer 225P may supply holes to the additional emission layer 227. In an embodiment, the positive charge-generating layer 225P may be a p-type charge-generating layer. The positive charge-generating layer 225P may include hosts and dopants. In an embodiment, the host may include an organic material. The dopant may include a metal material.

The second hole transport layer 226T may be disposed on the positive charge-generating layer 225P. The second hole transport layer 226T may move holes transferred from the positive charge-generating layer 225P to the additional emission layer 227, and bind electrons transferred from the opposite electrode 229 to the additional emission layer 227.

The additional emission layer 227 may be disposed on the second hole transport layer 226T. Carriers such as holes and electrons may be recombined in the additional emission layer 227, and excitons may be created. In case that the excitons change from an excited state to a ground state, light may be generated.

The second electron transport layer 228T may be disposed on the additional emission layer 227. The second electron transport layer 228T may transport electrons transferred from the opposite electrode 229 to the additional emission layer 227. In an embodiment, the second electron transport layer 228T may include a mixture of at least two materials. In an embodiment, the second electron transport layer 228T may include a buffer layer including an electron transport compound.

The electron injection layer 2281 may be disposed on the second electron transport layer 228T. The electron injection layer 2281 may swiftly inject electrons. The electron injection layer 2281 may include a metal material.

The opposite electrode 229 may be disposed on the electron injection layer 2281. In case that the organic light-emitting diode OLED includes the emission layer 223 and the additional emission layer 227 that are sequentially stacked, the brightness of the organic light-emitting diode OLED may increase, and the life of the organic light-emitting diode OLED may increase.

Figure 5:
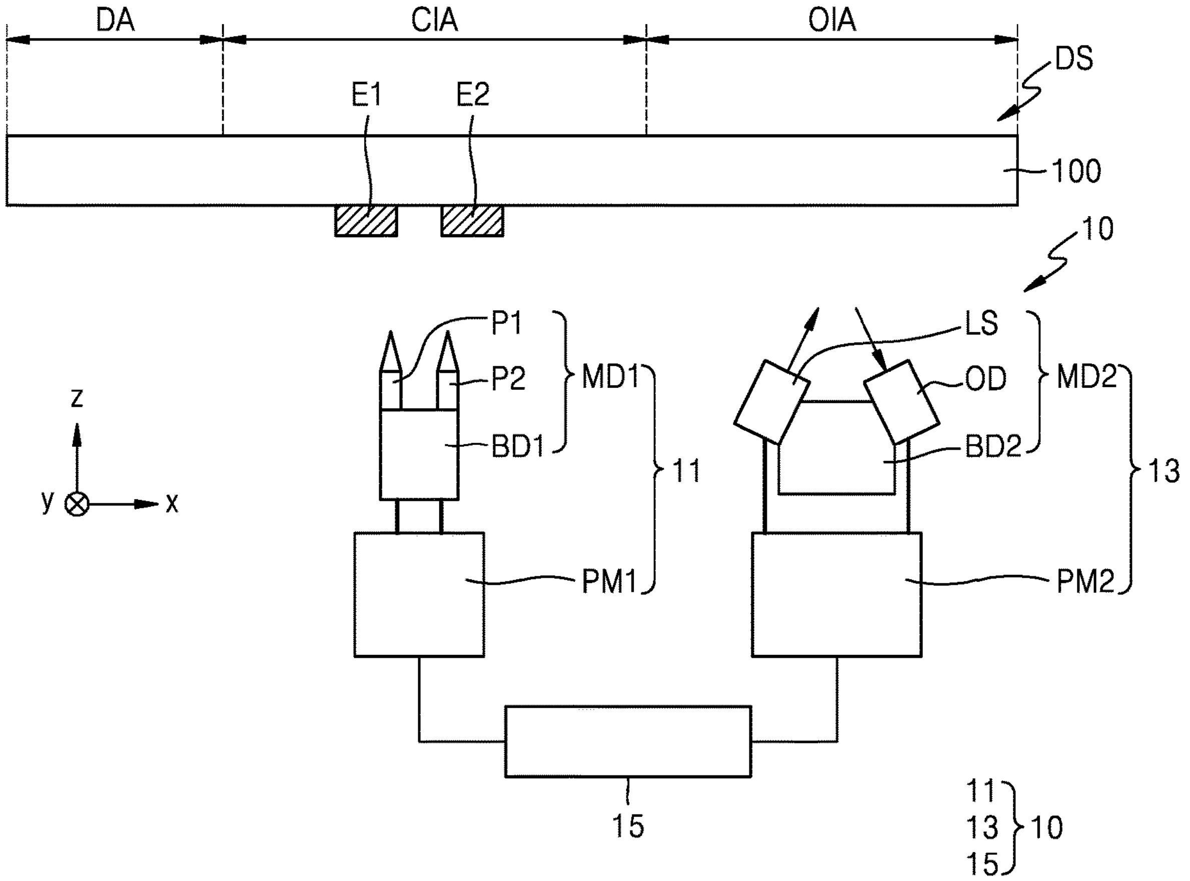
FIG. 5 is a schematic view of an apparatus for inspecting a display apparatus according to an embodiment.

FIG. 5 is a schematic view of an apparatus 10 for inspecting a display apparatus according to an embodiment. In FIG. 5, the same reference numerals as those of FIG. 2 denote the same members, and thus, redundant descriptions thereof are omitted for descriptive convenience.

Referring to FIG. 5, the apparatus 10 for inspecting the display apparatus may inspect a display substrate DS. In an embodiment, the display substrate DS may be a display apparatus being manufactured. In an embodiment, the display substrate DS may be display apparatuses being manufactured. For example, the display substrate DS for which a manufacturing process is completed, may be cut, and the display apparatuses may be separated from each other.

The display substrate DS may include the substrate 100, a first electrode E1, a second electrode E2, a first layer, and an optical inspection layer. The substrate 100 may include the display area DA, a current inspection area CIA, and an optical inspection area OIA. The current inspection area CIA and the optical inspection area OIA may be regions that are removed from the display substrate DS in case that the manufacturing process ends. The display area DA may be a region in which pixels are arranged. A first electrode E1 and a second electrode E2 may be arranged in the current inspection area CIA. In an embodiment, the first layer may connect (e.g., electrically connect) the first electrode E1 to the second electrode E2. The current inspection area CIA may be a region in which a current value flowing through the first layer arranged in the current inspection area CIA, is measured. An optical inspection layer may be arranged in the optical inspection area OIA. The optical inspection area OIA may be a region in which the thickness of the optical inspection layer arranged in the optical inspection area OIA, is optically measured.

Though it is shown in FIG. 5 that the display area DA is adjacent to the current inspection area CIA, the display area DA may be apart from the current inspection area CIA in an embodiment. Though it is shown in FIG. 5 that the current inspection area CIA is adjacent to the optical inspection area OIA, the current inspection area CIA may be apart from the optical inspection area OIA in an embodiment.

The apparatus 10 for inspecting the display apparatus may include a current inspector 11, an optical inspector 13, and a controller 15. Accordingly, the apparatus 10 for inspecting the display apparatus may flow a current through the display substrate DS and measure a current value thereof, or may irradiate light to the display substrate DS and measure light reflected by the display substrate DS. In case that the apparatus 10 for inspecting the display apparatus includes the current inspector 11 and the optical inspector 13, an accuracy of inspection may increase. In an embodiment, the optical inspector 13 of the apparatus 10 for inspecting the display apparatus may be optional.

The current inspector 11 may include a first module MD1 and a first processing module PM1. The first module MD1 may move in at least one of a first direction (e.g., an x direction), a second direction (e.g., a y direction), and a third direction (e.g., a z direction). The first module MD1 may move automatically or manually. As an example, the first module MD1 may be automatically moved by a moving apparatus having a driver. In another example, the first module MD1 may be moved manually.

The first module MD1 may include a first main body BD1, a first contact probe P1, and a second contact probe P2. The first main body BD1 may move in at least one of a first direction (e.g., an x direction), a second direction (e.g., a y direction), and a third direction (e.g., a z direction). The first contact probe P1 may be connected to the first main body BD1 mechanically and/or electrically. The first contact probe P1 may be connected (e.g., electrically connected) to the first electrode E1. As an example, the first contact probe P1 may contact a first pad connected (e.g., electrically connected) to the first electrode E1. The second contact probe P2 may be connected to the first main body BD1 mechanically and/or electrically. The second contact probe P2 may be connected (e.g., electrically connected) to the second electrode E2. As an example, the second contact probe P2 may contact a second pad connected (e.g., electrically connected) to the second electrode E2.

The first processing module PM1 may process current data transferred from the first module MD1. In an embodiment, the first processing module PM1 may include a source measure unit. In an embodiment, the first processing module PM1 may include a sheet resistance-measuring unit.

In an embodiment, the first processing module PM1 may calculate a doping concentration of the first layer based on the current value measured by the first module MD1. The first processing module PM1 may have first relation data regarding a current value and a doping concentration of the first layer. The first processing module PM1 may calculate the doping concentration of the first layer from a current value measured by the first module MD1 by using the first relation data. In an embodiment, the first processing module PM1 may calculate a thickness of the first layer based on the current value measured by the first module MD1. In another example, the first processing module PM1 may calculate a thickness of the first layer from the sheet resistance value of the first layer measured by the first module MD1. The sheet resistance value may be measured by the sheet resistance measuring unit. The first processing module PM1 may have second relation data regarding a current value or a sheet resistance value and a thickness of the first layer. The first processing module PM1 may calculate the thickness of the first layer from a current value or a sheet resistance value measured by the first module MD1 by using the second relation data.

The optical inspector 13 may be an ellipsometer. As an example, the optical inspector 13 may be a null ellipsometer that detects or senses a null point by adjusting a linear polarizer and a compensator. As another example, the optical inspector 13 may be a rotating-polarizer ellipsometer in which a linear polarizer of a light source module rotates at a constant speed. As another example, the optical inspector 13 may be a rotating-analyzer ellipsometer in which a linear polarizer of a light receiver module rotates at a constant speed. As another example, the optical inspector 13 may be a rotating-compensator ellipsometer in which a compensator of a light receiver module rotates at a constant speed.

The optical inspector 13 may include a second module MD2 and a second processing module PM2. The second module MD2 may move in at least one of a first direction (e.g., an x direction), a second direction (e.g., a y direction), and a third direction (e.g., a z direction). The second module MD2 may move automatically or manually. As an example, the second module MD2 may be automatically moved by a moving apparatus having a driver. In another example, the second module MD2 may be moved manually.

The second module MD2 may include a second main body BD2, a light source LS, and an optical detector OD. In an embodiment, the second module MD2 may further include a linear polarizer that linearly polarizes light emitted from the light source LS. In an embodiment, the second module MD2 may further include a linear polarizer that filters specific polarized light of reflected light. The second main body BD2 may move in at least one of a first direction (e.g., an x direction), a second direction (e.g., a y direction), and a third direction (e.g., a z direction). The light source LS may irradiate light toward the optical inspection layer. The light source LS may be connected to the second main body BD2 mechanically and/or electrically. In an embodiment, the light source LS may be a white light source. The light source LS may be a monochromatic light source such as laser light. The optical detector OD may detect light reflected by the optical inspection layer. In an embodiment, the optical detector OD may include unit elements. The unit elements may detect reflected light. In an embodiment, the optical detector OD may include a charge coupled device (CCD). In an embodiment, the optical detector OD may include complementary metal oxide semiconductor (CMOS).

The second processing module PM2 may process optical data of reflected light transferred from the second module MD2. The second processing module PM2 may calculate the thickness of the optical inspection layer based on the optical data. As an example, the second processing module PM2 may extract light characteristics such as a refractive index or an extinction coefficient from optical data such as a change in the polarization state of reflected light. The second processing module PM2 may calculate the thickness of the optical inspection layer based on the light characteristics.

The controller 15 may be connected (e.g., electrically connected) to the current inspector 11 and the optical inspector 13. The controller 15 may receive data from at least one of the current inspector 11 and the optical inspector 13. In an embodiment, the controller 15 may receive data regarding the calculated doping concentration of the first layer from the current inspector 11. In an embodiment, the controller 15 may receive data regarding the calculated thickness of the first layer from the current inspector 11. The controller 15 may receive data regarding the thickness of the optical inspection layer from the optical inspector 13.

The controller 15 may adjust a condition of the process of manufacturing the display apparatus by taking into account the data. In an embodiment, in case that the data is different from data set in advance, the controller 15 may adjust a condition of the process of manufacturing the display apparatus. As an example, the controller 15 may adjust temperature and/or pressure of a region in which the display substrate DS is arranged. Accordingly, the apparatus 10 for inspecting the display apparatus may inspect the display substrate DS in real-time during the process of manufacturing the display apparatus, and adjust the condition of the process of manufacturing the display apparatus. Accordingly, a defect of a manufactured display apparatus may be reduced.

FIGS. 6A to 6D are schematic cross-sectional views showing a method of inspecting a display apparatus according to an embodiment.

Figure 6A:
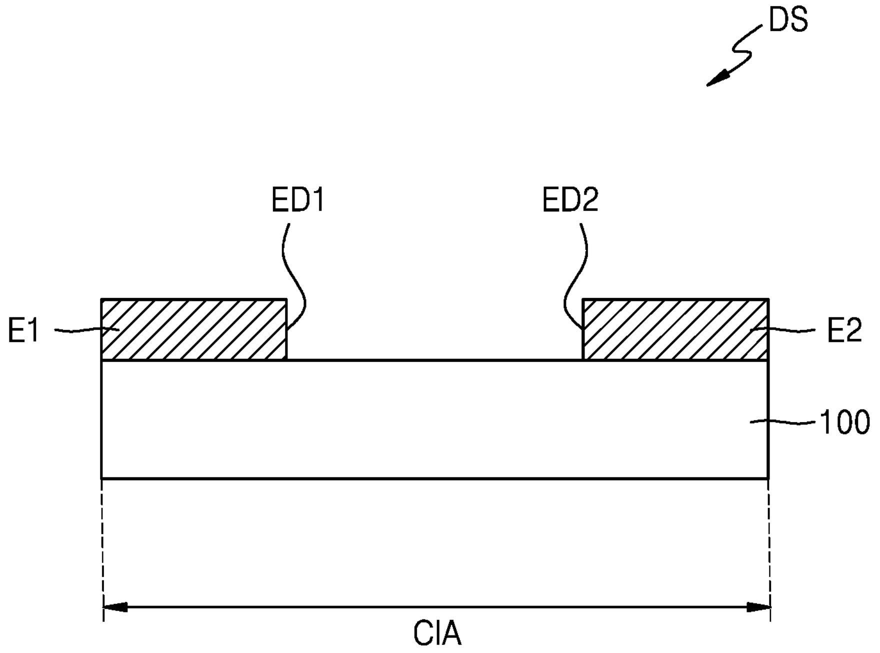
FIGS. 6A to 6D are schematic cross-sectional views showing a method of inspecting a display apparatus according to an embodiment.
Figure 6B:
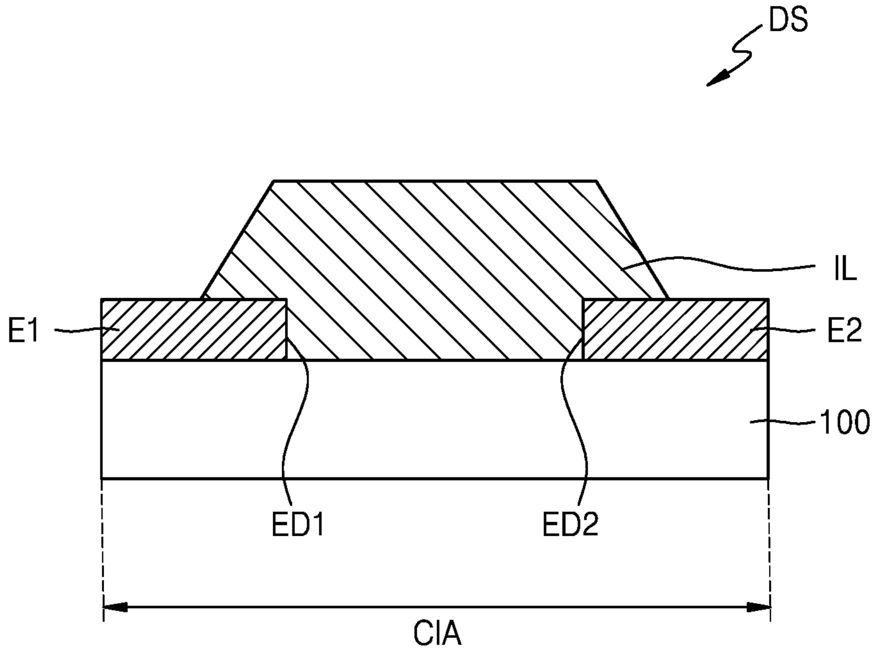
Figure 6C:
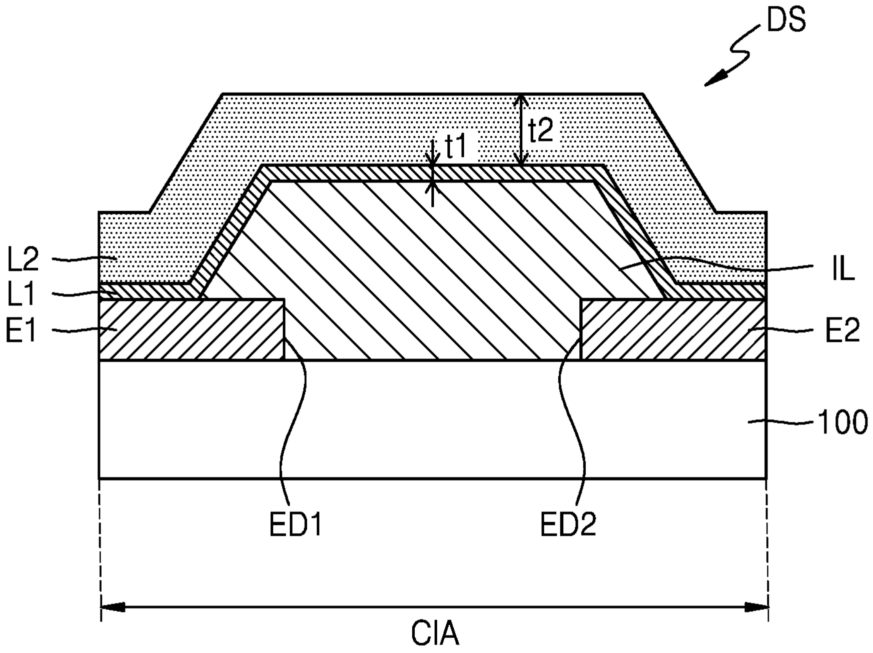

Referring to FIGS. 6A to 6C, the display substrate DS may be provided (i.e., prepared). The display substrate DS may include the substrate 100, the first electrode E1, the second electrode E2, an insulating layer IL, a first layer L1, and a second layer L2. The substrate 100 may include the current inspection area CIA.

The first electrode E1 and the second electrode E2 may be arranged in the current inspection area CIA. The first electrode E1 may be apart from the second electrode E2. The first electrode E1 may be apart from the second electrode E2 in the lengthwise direction of the substrate 100. The first electrode E1 may have a first edge portion ED1. The second electrode E2 may have a second edge portion ED2. The insulating layer IL may cover the first edge portion ED1 of the first electrode E1 and the second edge portion ED2 of the second electrode E2. The first layer L1 may be disposed on the first electrode E1, the second electrode E2, and the insulating layer IL. The first layer L1 may contact (e.g., directly contact) the first electrode E1 and the second electrode E2. The second layer L2 may be disposed on the first layer L1. In another example, the second layer L2 may be omitted.

Hereinafter, an operation of providing (i.e., preparing) the display substrate DS according to an embodiment is described in detail.

Referring to FIG. 6A, the first electrode E1 and the second electrode E2 may be arranged in the current inspection area CIA. At least one of the first electrode E1 and the second electrode E2 may include a conductive oxide such as indium tin oxide (ITO), indium zinc oxide (IZO), zinc oxide (ZnO), indium oxide ($In_2O_3$), indium gallium oxide (IGO), or aluminum zinc oxide (AZO). At least one of the first electrode E1 and the second electrode E2 may include a reflective layer including silver (Ag), magnesium (Mg), aluminum (AI), platinum (Pt), palladium (Pd), gold (Au), nickel (Ni), neodymium (Nd), iridium (Ir), chrome (Cr), or a compound thereof. At least one of the first electrode E1 and the second electrode E2 may further include a layer including ITO, IZO, ZnO, or $In_2O_3$ on/under the reflective layer. As an example, at least one of the first electrode E1 and the second electrode E2 may have a multi-layered structure of ITO/Ag/ITO. In an embodiment, the first electrode E1 and the second electrode E2 and the pixel electrode 221 of FIG. 4 may include the same material. For example, the first electrode E1 and the second electrode E2 may be formed by the same process as a process of forming the pixel electrode 221.

Referring to FIG. 6B, the insulating layer IL covering the first edge portion ED1 of the first electrode E1 and the second edge portion ED2 of the second electrode E2, may be formed. The insulating layer IL may not cover at least a portion of the upper surface of the first electrode E1. In an embodiment, the insulating layer IL may include an organic material and/or an inorganic material. In an embodiment, the insulating layer IL may be transparent. In an embodiment, the insulating layer IL may include a black matrix. For example, the insulating layer IL may be opaque (or a light blocking layer). In an embodiment, the insulating layer IL and the pixel-defining layer 220L of FIG. 3 may include the same material. For example, the insulating layer IL may be formed by the same process of forming the pixel-defining layer 220L.

Referring to FIG. 6C, the first layer L1 may be disposed on the first electrode E1, the insulating layer IL, and the second electrode E2. The first layer L1 may contact (e.g., directly contact) the first electrode E1 and the second electrode E2. The first layer L1 may include a layer which is one of a hole injection layer, a hole transport layer, a negative charge-generating layer, a positive charge-generating layer, an electron injection layer, an emission layer, and an electron transport layer, and the layer may be doped with dopants. In an embodiment, the first layer L1 may be a p-dopant hole injection layer (p-HIL) doped with p-type dopants. In an embodiment, the first layer L1 may be the emission layer 223 of FIG. 4 or the additional emission layer 227 of FIG. 4. In an embodiment, the first layer L1 may be the negative charge-generating layer 225N of FIG. 4. In an embodiment, the first layer L1 may be the positive charge-generating layer 225P of FIG. 4. In an embodiment, the first layer L1 may be the electron injection layer 2281 of FIG. 4. In an embodiment, the first layer L1 may be one of the first hole transport layer 222T, the first electron transport layer 224T, the second hole transport layer 226T, and the second electron transport layer 228T of FIG. 4.

The second layer L2 may be disposed on the first layer L1. A thickness t1 of the first layer L1 may be less than a thickness t2 of the second layer L2. In an embodiment, in case that the first layer L1 is the first hole injection layer doped with p-type dopants, the second layer L2 may be the second hole injection layer including hosts. In an embodiment, in case that the first layer L1 is an electron injection layer, the second layer L2 may be the opposite electrode.

Figure 6D:
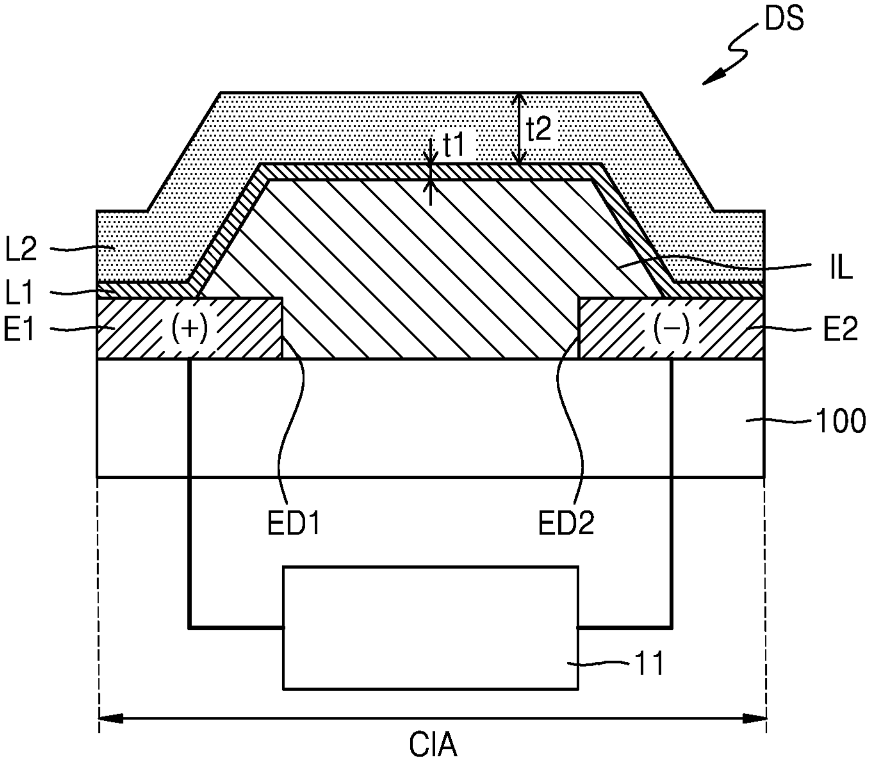

Referring to FIG. 6D, a first voltage and a second voltage may be respectively applied to the first electrode E1 and the second electrode E2, and a current value flowing through the first layer L1 may be measured. In an embodiment, the current inspector 11 may apply the first voltage and the second voltage to the first electrode E1 and the second electrode E2, and measure the current value flowing through the first layer L1. For example, the first contact probe may contact the first pad connected (e.g., electrically connected) to the first electrode E1, and the second contact probe may contact the second pad connected (e.g., electrically connected) to the second electrode E2. The thickness t1 of the first layer L1 may be less than the thickness t2 of the second layer L2. As an example, the thickness t1 of the first layer L1 may be about 10 Å. The thickness t2 of the second layer L2 may be 100 Å or more. For example, the thickness of the first layer L1 or a characteristic thereof is very thin, it may not be measured by the optical inspector. To measure the thickness of the first layer L1 by using the optical inspector, the first layer L1 may be formed thick separately. As an example, the separate first layer L1 may be formed to have a thickness of 10 times to 30 times or more than the thickness t1 of the first layer L1 applied to the display apparatus. For example, the doping concentration at which the first layer L1 is doped may be difficult to measure with the optical inspector. In an embodiment, because the current inspector 11 may apply the first voltage and the second voltage to the first electrode E1 and the second electrode E2, and measure the current value flowing through the first layer L1, the characteristic of the first layer L1 may be inspected. Accordingly, the first layer L1 may not need to be formed thick separately.

The first layer L1 may contact (e.g., directly contact) the first electrode E1 and the second electrode E2. The first layer L1 may include an organic material, and the first layer L1 may include a very higher resistivity than that of a metal or an inorganic semiconductor material. Accordingly, if the first layer L1 has a very high resistivity and the first layer L1 does not contact the first electrode E1 and the second electrode E2 directly, a current value may be measured to be low. In an embodiment, because the first layer L1 contacts (e.g., directly contacts) the first electrode E1 and the second electrode E2, in case that the first voltage and the second voltage are respectively applied to the first electrode E1 and the second electrode E2, a current value may be amplified and measured.

In case that the first layer L1 includes dopants, the current inspector 11 may calculate the doping concentration of the first layer L1 based on the current value. As an example, in case that the first layer L1 is the first hole injection layer doped with p-type dopants, the current inspector 11 may calculate the doping concentration of the first layer L1 based on the current value.

The current inspector 11 may calculate the thickness of the first layer L1 based on the current value. As an example, in case that the first layer L1 is the electron injection layer, the current inspector 11 may calculate the thickness t1 of the first layer L1 based on the current value.

Figure 7A:
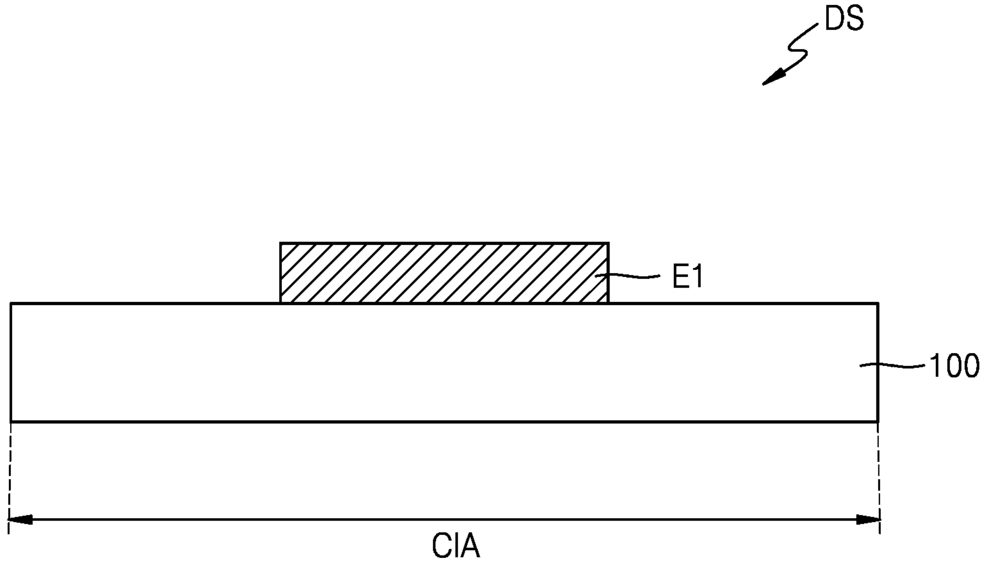
FIGS. 7A to 7D are schematic cross-sectional views showing a method of inspecting a display apparatus according to an embodiment.
Figure 7B:
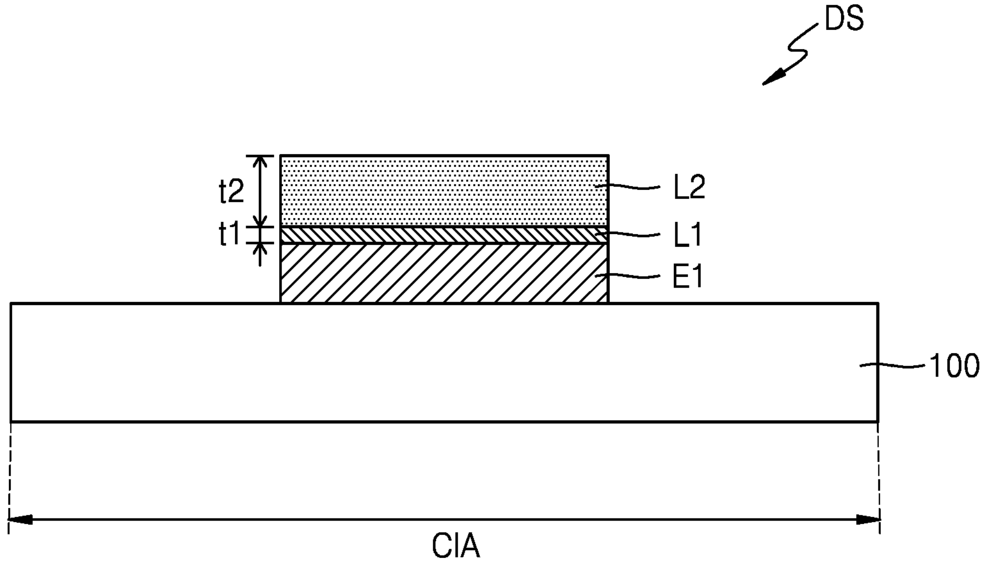
Figure 7C:
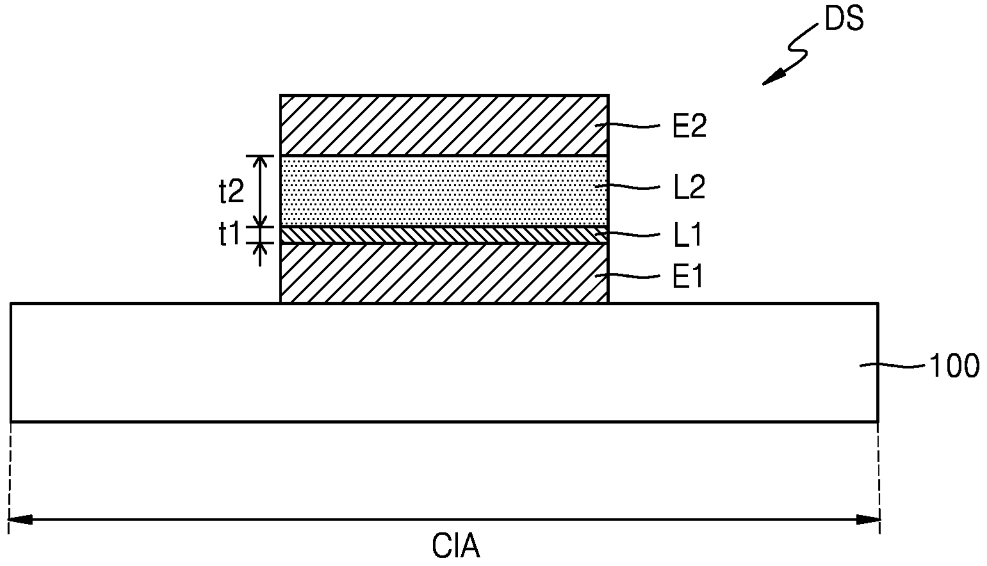
Figure 7D:
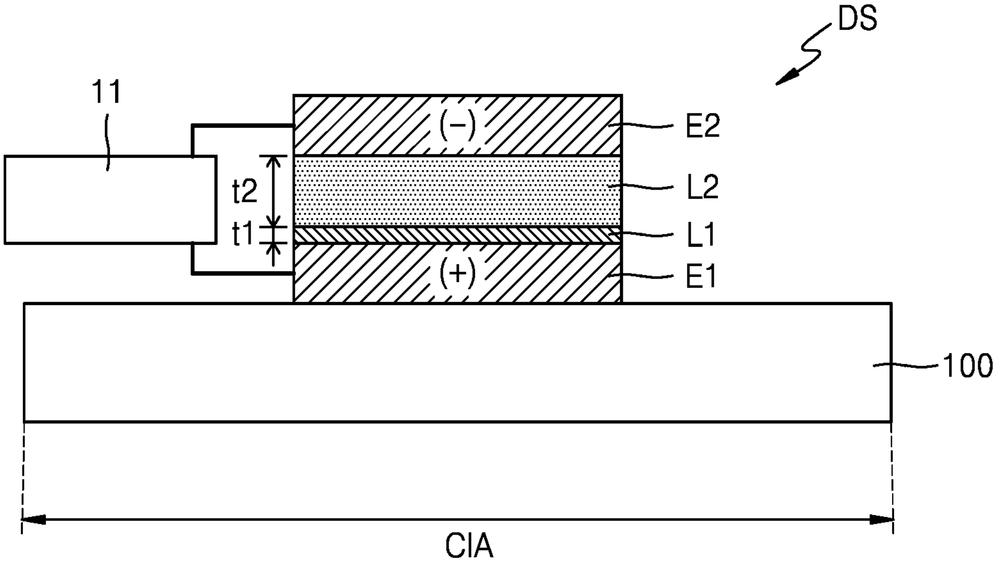

FIGS. 7A to 7D are schematic cross-sectional views showing a method of inspecting a display apparatus according to an embodiment. In FIGS. 7A and 7D, the same reference numerals as those of FIGS. 6A to 6D denote the same members, and thus, redundant descriptions thereof are omitted for descriptive convenience.

Referring to FIGS. 7A to 7C, the display substrate DS may be provided (i.e., prepared). The display substrate DS may include the substrate 100, the first electrode E1, the first layer L1, the second layer L2, and the second electrode E2. The substrate 100 may include the current inspection area CIA. In an embodiment, the first electrode E1, the first layer L1, the second layer L2, and the second electrode E2 may be sequentially stacked in the thickness direction of the substrate 100.

The first electrode E1 may be arranged in the current inspection area CIA. The first electrode E1 may be apart from the second electrode E2 in the thickness direction of the substrate 100. The first layer L1 may be disposed on the first electrode E1. The second layer L2 may be disposed on the first layer L1. The second electrode E2 may be disposed on the second layer L2.

Hereinafter, an operation of providing (i.e., preparing) the display substrate DS according to an embodiment is described in detail.

Referring to FIG. 7A, the first electrode E1 may be arranged in the current inspection area CIA. The first electrode E1 may include a conductive oxide such as indium tin oxide (ITO), indium zinc oxide (IZO), zinc oxide (ZnO), indium oxide ($In_2O_3$), indium gallium oxide (IGO), or aluminum zinc oxide (AZO). The first electrode E1 may include a reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof. The first electrode E1 may further include a layer on/under the reflective layer, the layer including ITO, IZO, ZnO, or $In_2O_3$. As an example, the first electrode E1 may have a multi-layered structure of ITO/Ag/ITO. In an embodiment, the first electrode E1 and the pixel electrode 221 of FIG. 4 may include the same material. For example, the first electrode E1 may be formed by the same process as a process of forming the pixel electrode 221.

Referring to FIG. 7B, the first layer L1 may be disposed on the first electrode E1. The first layer L1 may include a layer which is one of a hole injection layer, a hole transport layer, a negative charge-generating layer, a positive charge-generating layer, an electron injection layer, an emission layer, and an electron transport layer, and the layer may be doped with dopants. The second layer L2 may be disposed on the first layer L1. The thickness t1 of the first layer L1 may be less than the thickness t2 of the second layer L2. In another example, the second layer L2 may be omitted. In an embodiment, in case that the first layer L1 is the first hole injection layer doped with p-type dopants, the second layer L2 may be the second hole injection layer including hosts.

Referring to FIG. 7C, the second electrode E2 may be disposed on the second layer L2. The second electrode E2 may include a conductive material having a low work function. The second electrode E2 may include a (semi) transparent layer including silver (Ag), magnesium (Mg), aluminum (Al), platinum (Pt), palladium (Pd), gold (Au), nickel (Ni), neodymium (Nd), iridium (Ir), chrome (Cr), or an alloy thereof. In another example, the second electrode E2 may further include a layer on the (semi) transparent layer, the layer including ITO, IZO, ZnO, or $In_2O_3$. In an embodiment, the second electrode E2 may include the same material as that of the opposite electrode 229 of FIG. 3, and be formed by the same process as a process of forming the opposite electrode 229.

Referring to FIG. 7D, a first voltage and a second voltage may be respectively applied to the first electrode E1 and the second electrode E2, and a current value flowing through the first layer L1 may be measured. In an embodiment, the current inspector 11 may apply the first voltage and the second voltage to the first electrode E1 and the second electrode E2, and measure the current value flowing through the first layer L1. For example, the first contact probe may contact the first pad connected (e.g., electrically connected) to the first electrode E1, and the second contact probe may contact the second pad connected (e.g., electrically connected) to the second electrode E2. In an embodiment, because the current inspector 11 may apply the first voltage and the second voltage to the first electrode E1 and the second electrode E2, and measure the current value flowing through the first layer L1, the characteristic of the first layer L1 may be inspected.

The first layer L1 may overlap the first electrode E1 partially or entirely. A current may flow in the thickness direction of the substrate 100 between the first electrode E1 and the second electrode E2. Accordingly, because the current flows through the first layer L1 entirely in the thickness direction of the substrate 100, a current value may be amplified and measured. In an embodiment, in case that an area in which the first electrode E1 overlaps the second electrode E2 increases even more, a current value may be amplified even more.

In case that the first layer L1 includes dopants, the current inspector 11 may calculate the doping concentration of the first layer L1 based on the current value. As an example, in case that the first layer L1 is the first hole injection layer doped with p-type dopants, the current inspector 11 may calculate the doping concentration of the first layer L1 based on the current value.

The current inspector 11 may calculate the thickness of the first layer L1 based on the current value. As an example, in case that the first layer L1 is the electron injection layer, the current inspector 11 may calculate the thickness t1 of the first layer L1 based on the current value.

Figure 8:
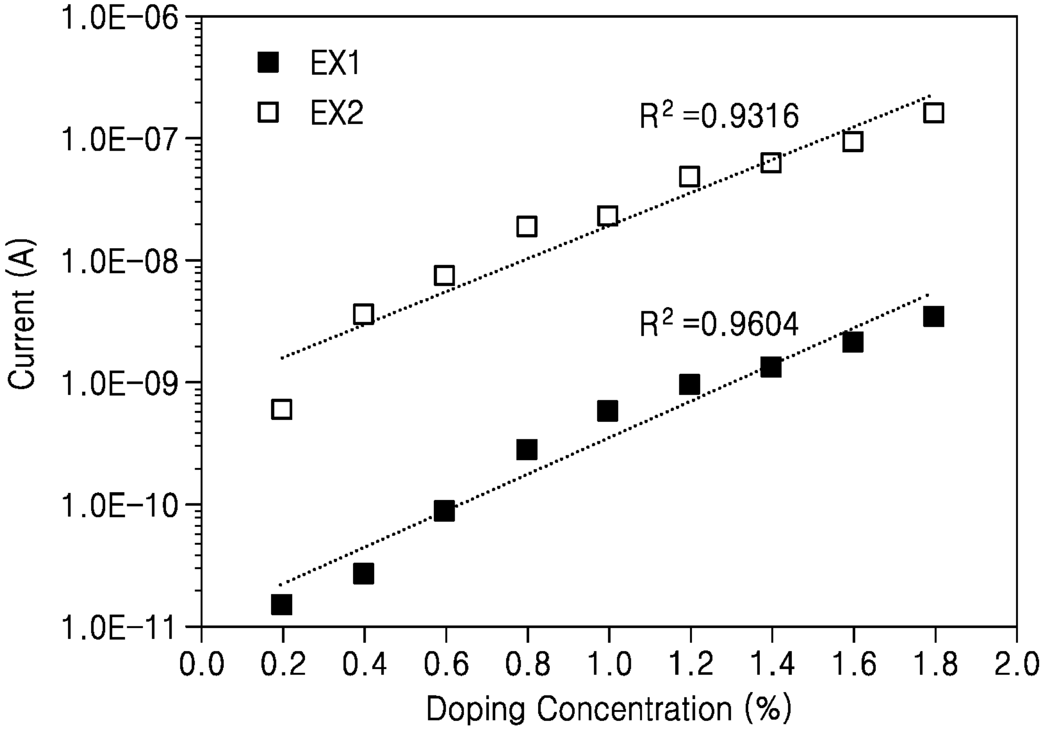
FIGS. 8 and 9 are graphs showing a relationship between a current value and a doping concentration of a first layer.
Figure 9:
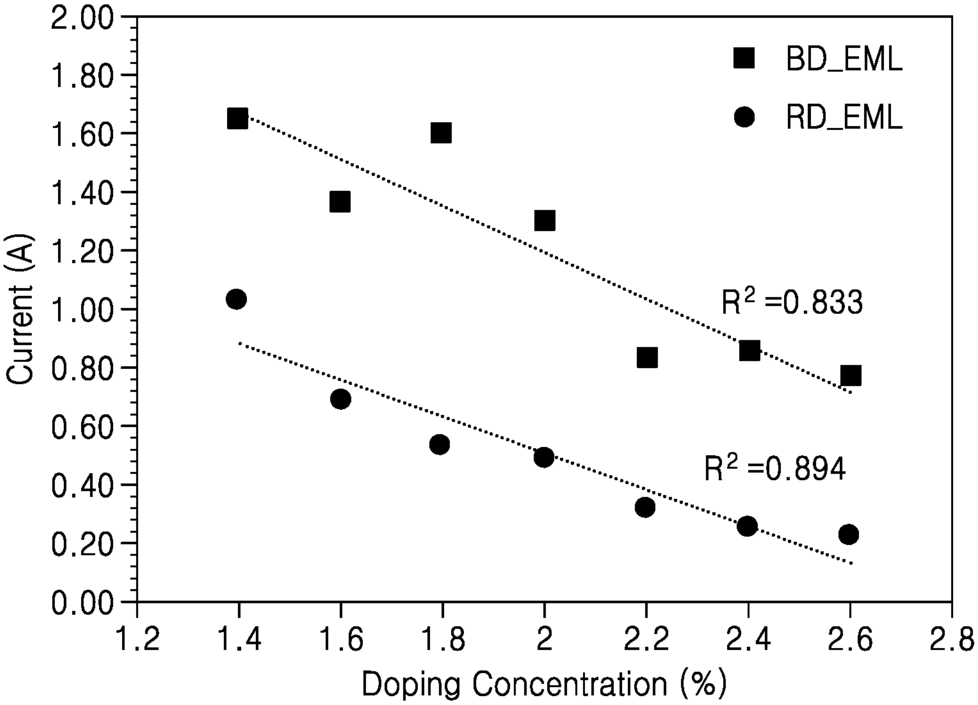

FIGS. 8 and 9 are graphs showing a relationship between a current value and a doping concentration of a first layer. In FIG. 8, the first layer may be a p-dopant hole injection layer (p-HIL) doped with p-type dopants. In FIG. 9, the first layer may be an emission layer.

Referring to FIG. 8, the doping concentrations of the first layer may be determined by changing with an interval of about 0.2%, and the current values may be measured by the doping concentrations accordingly. The current value may be measured by a source measure unit. A reference numeral EX1 denotes a current value according to the doping concentration of the first layer L1 in the embodiment of FIG. 6D, and a reference numeral EX2 denotes a current value according to the doping concentration of the first layer L1 in the embodiment of FIG. 7D. Determination coefficients R2 of the current values EX1 and EX2 may have a value in the range of about 0.93 to about 0.96. In the embodiment of FIG. 6D and the embodiment of FIG. 7D, the doping concentrations of the first layer L1 and the current values may have a substantially linear relationship.

Referring to FIG. 9, the doping concentrations of the first layer may be determined by changing with an interval of about 0.2%, and a current value may be measured by the doping concentrations accordingly. A reference numeral RD_EML denotes a current value according to the doping concentration of the first layer in case that the first layer is a red emission layer including red dopants. A reference numeral BD_EML denotes a current value according to the doping concentration of the first layer in case that the first layer is a blue emission layer including blue dopants. Determination coefficients R2 of the current values RD_EML and BD_EML may have a value in the range of about 0.83 to about 0.89. In the case where the first layer includes red dopants, and the first layer includes blue dopants, the doping concentrations of the first layer and the current values may have a substantially linear relationship.

Because the first processing module may have a first relation data for the current values and the doping concentrations of the first layer as shown in FIGS. 8 and 9, the first processing module may calculate the doping concentration of the first layer based on the current value measured by the first module.

Figure 10:
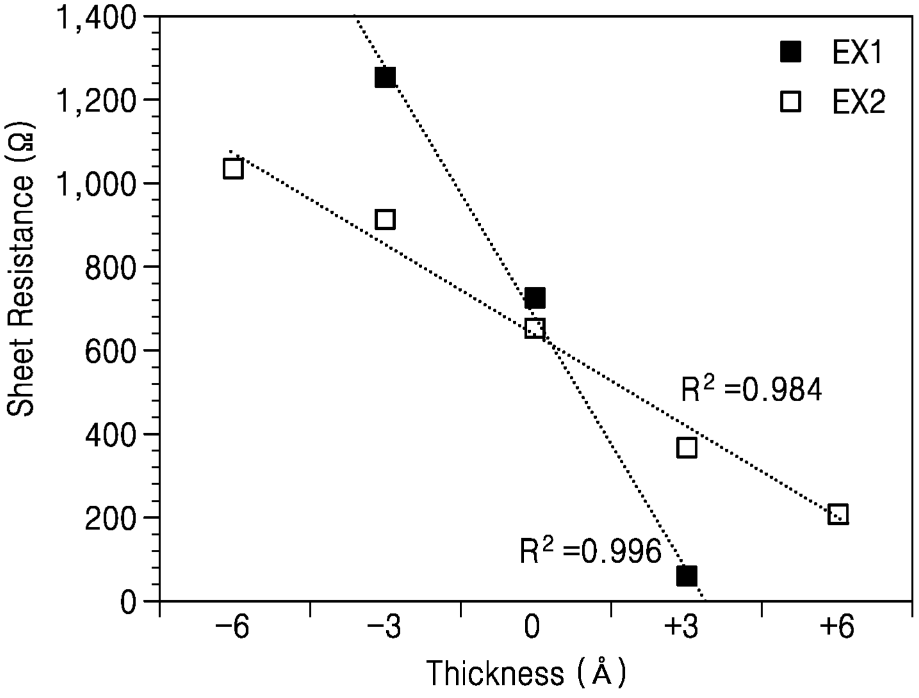
FIG. 10 is a graph showing a relationship between a sheet resistance and a thickness of the first layer.

FIG. 10 is a graph showing a relationship between a sheet resistance and the thickness of the first layer. In FIG. 10, the first layer is an electron injection layer.

Referring to FIG. 10, the thicknesses of the first layer may be determined by changing with an interval of about 3 Å, and sheet resistance values may be measured by the thicknesses of the first layer accordingly. The sheet resistance values may be measured by a sheet resistance measuring unit. A sheet resistance value of the first layer L1 may be calculated based on the current value flowing through the first layer. A reference numeral EX1 denotes a sheet resistance value according to the thickness of the first layer L1 in the embodiment of FIG. 6D, and a reference numeral EX2 denotes a sheet resistance value according to the thickness of the first layer L1 in the embodiment of FIG. 7D. Determination coefficients R2 of the sheet resistance values EX1 and EX2 may have a value in the range of about 0.98 to about 0.99. In the embodiment of FIG. 6D and the embodiment of FIG. 7D, the thickness of the first layer L1 and the sheet resistance value may have a substantially linear relationship.

Figure 11:
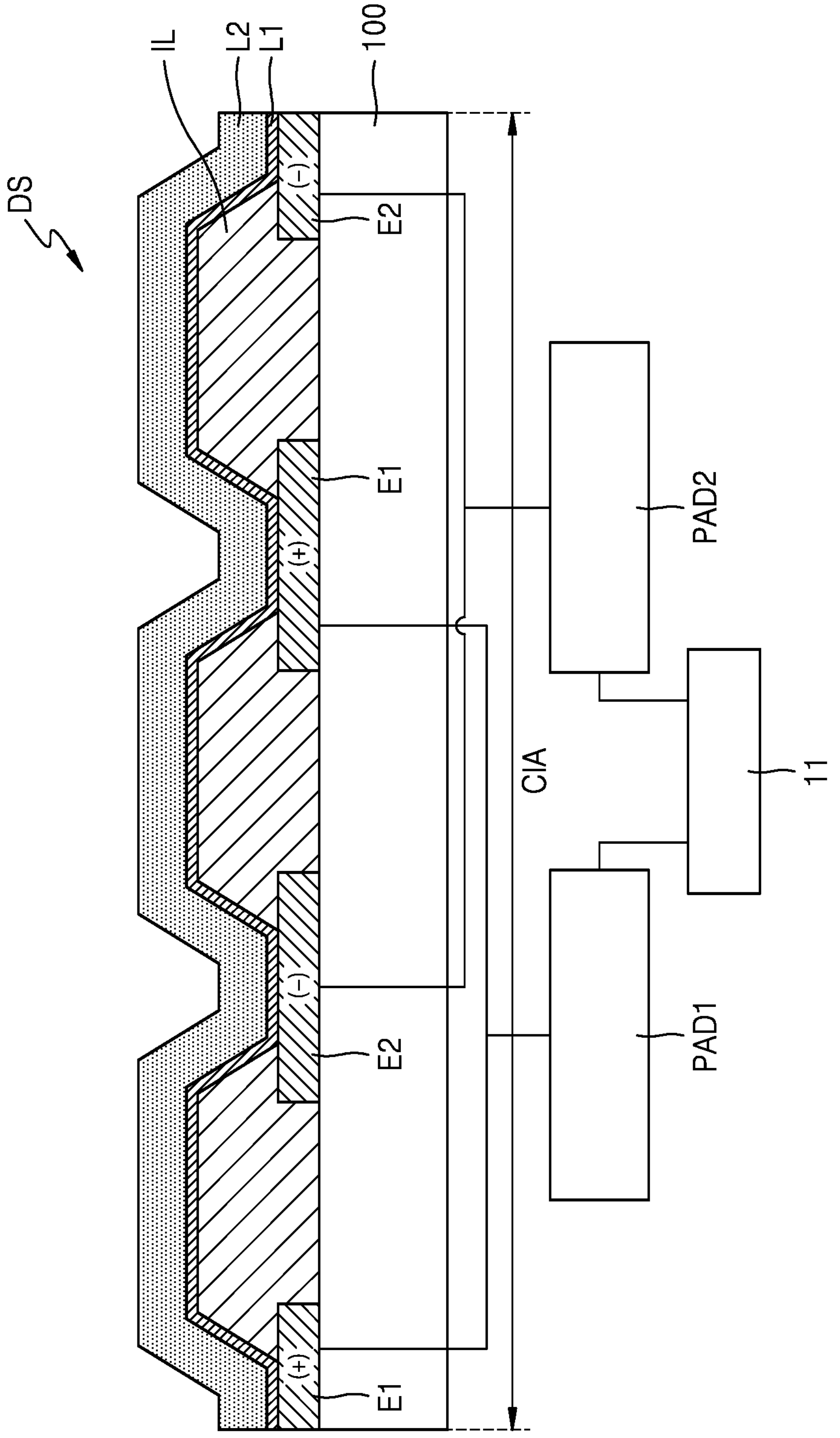
FIG. 11 is a schematic cross-sectional views showing a method of inspecting a display apparatus according to an embodiment.

FIG. 11 is a schematic cross-sectional view showing a method of inspecting a display apparatus according to an embodiment. In FIG. 11, the same reference numerals as those of FIG. 6D denote the same members, and thus, redundant descriptions thereof are omitted for descriptive convenience.

Referring to FIG. 11, the display substrate DS may be provided (i.e., prepared). The display substrate DS may include the substrate 100, the first electrode E1, the second electrode E2, the insulating layer IL, the first layer L1, the second layer L2, a first pad PAD1, and a second pad PAD2. The substrate 100 may include the current inspection area CIA.

The first electrode E1 and the second electrode E2 may be arranged in the current inspection area CIA. The first electrode E1 may be apart from the second electrode E2 in the lengthwise direction of the substrate 100. The first electrode E1 may include first electrodes E1. The second electrode E2 may include second electrodes E2. The insulating layer IL may cover first edge portions of the first electrodes E1 and second edge portions of the second electrodes E2. The first layer L1 may be disposed on the first electrode E1, the second electrode E2, and the insulating layer IL. The first layer L1 may contact (e.g., directly contact) the first electrodes E1 and the second electrodes E2. The second layer L2 may be disposed on the first layer L1. In another example, the second layer L2 may be omitted.

The first pad PAD1 may be connected (e.g., electrically connected) to the first electrodes E1. The second pad PAD2 may be connected (e.g., electrically connected) to the second electrodes E2. The first pad PAD1 and the second pad PAD2 may be connected (e.g., electrically connected) to the current inspector 11. As an example, the first pad PAD1 may contact the first contact probe. The second pad PAD2 may contact the second contact probe. A current value flowing through the first layer L1 may be measured by respectively applying the first voltage and the second voltage to the first pad PAD1 and the second pad PAD2.

In case that the display substrate DS includes the first electrodes E1, the second electrodes E2, the first pad PAD1, and the second pad PAD2 as described above, the current value measured by the current inspector 11 may be amplified or a sheet resistance value may be lowered. Accordingly, an accurate measurement of the current inspector 11 may be performed.

Figure 12:
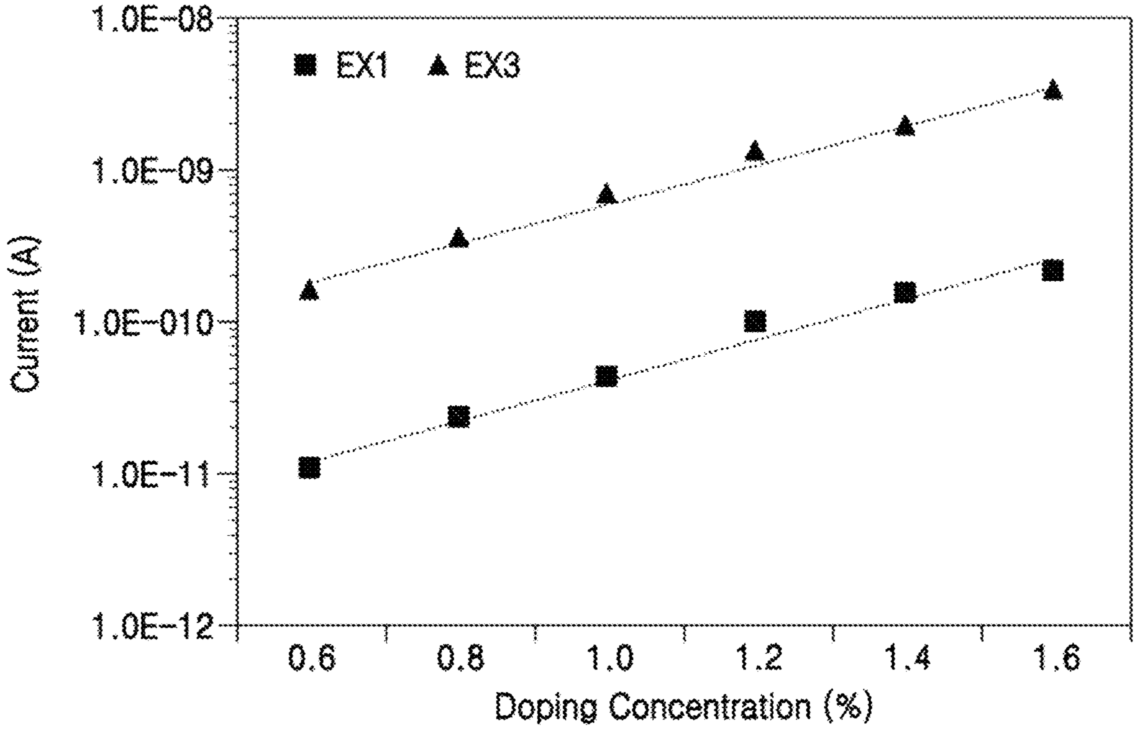
FIG. 12 are graphs showing a relationship between a current value and a doping concentration of a first layer.

FIG. 12 are graphs showing a relationship between a current value and a doping concentration of a first layer.

Referring to FIG. 12, the doping concentrations of the first layer may be determined by changing with an interval of about 0.2%, and current values may be measured by the doping concentrations accordingly. A reference numeral EX1 denotes current values according to the doping concentrations of the first layer L1 in the embodiment of FIG. 6D, and a reference numeral EX3 denotes current values according to the doping concentrations of the first layer L1 in the embodiment of FIG. 11. The current value EX3 may be, for example, for a structure including twenty four structures while each of the twenty four structures shows the result of the current value EX1. For example, the current values measured by the current inspector may be amplified. Accordingly, an accurate measurement of the current inspector may be performed.

FIGS. 13A to 13E are schematic cross-sectional views showing a method of inspecting a display apparatus according to an embodiment.

Referring to FIGS. 13A to 13D, the display substrate DS may be provided (i.e., prepared). The display substrate DS may include the substrate 100, the pixel electrode 221, the first electrode E1, the second electrode E2, a third electrode E3, the insulating layer IL, the first layer L1, the second layer L2, a third layer L3, a fourth layer L4, a first optical inspection layer OIL1, a second optical inspection layer OIL2, a first display area layer DAL1, a second display area layer DAL2, a fourth electrode E4, and the opposite electrode 229. The substrate 100 may include the display area DA, the current inspection area CIA, and the optical inspection area OIA.

The display area DA may be a region in which pixels are arranged. An organic light-emitting diode may be arranged in the display area DA. The organic light-emitting diode may include the pixel electrode 221, the first display area layer DAL1, the second display area layer DAL2, and the opposite electrode 229. The pixel electrode 221, the first display area layer DAL1, the second display area layer DAL2, and the opposite electrode 229 may be arranged in the display area DA. The pixel electrode 221, the first display area layer DAL1, the second display area layer DAL2, and the opposite electrode 229 may be sequentially stacked in the display area DA. Each of the first display area layer DAL1 and the second display area layer DAL2 may be a layer which is one of a hole injection layer, a hole transport layer, a negative charge-generating layer, a positive charge-generating layer, an electron injection layer, an emission layer, and an electron transport layer, and the layer may be doped with dopants.

The current inspection area CIA may include a first current inspection area CIA1 and a second current inspection area CIA2. The first electrode E1, the second electrode E2, the insulating layer IL, the first layer L1, and the second layer L2 may be arranged in the first current inspection area CIA1. The first electrode E1 may be apart from the second electrode E2 in the lengthwise direction of the substrate 100. The insulating layer IL may cover the first edge portion of the first electrode E1 and the second edge portion of the second electrode E2. The first layer L1 may be disposed on the first electrode E1, the second electrode E2, and the insulating layer IL. The first layer L1 may contact (e.g., directly contact) the first electrode E1 and the second electrode E2. The second layer L2 may be disposed on the first layer L1. In another example, the second layer L2 may be omitted.

The third electrode E3, the third layer L3, the fourth layer L4, and the fourth electrode E4 may be arranged in the second current inspection area CIA2. The third electrode E3, the third layer L3, the fourth layer L4, and the fourth electrode E4 may be sequentially stacked in the thickness direction of the substrate 100 in the second current inspection area CIA2.

For example, the structure of the embodiment described with reference to FIG. 6C, and the structure of the embodiment described with reference to FIG. 7C may be arranged in the current inspection area CIA.

The first optical inspection layer OIL1 and the second optical inspection layer OIL2 may be arranged in the optical inspection area OIA. The first optical inspection layer OIL1 and the second optical inspection layer OIL2 may be sequentially stacked in the thickness direction of the substrate 100 in the optical inspection area OIA.

Hereinafter, an operation of providing (i.e., preparing) the display substrate DS according to an embodiment is described in detail.

Figure 13A:
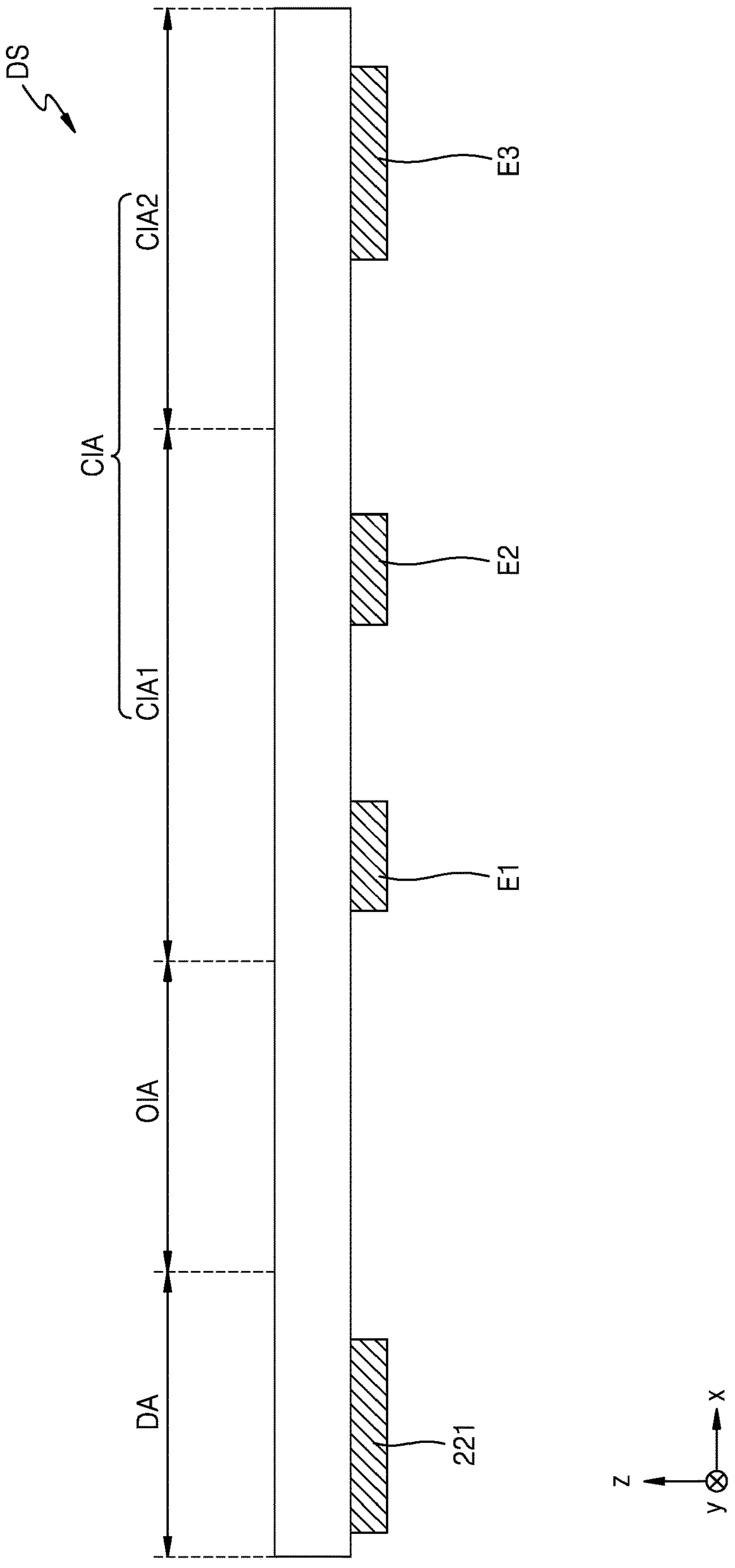
FIGS. 13A to 13E are schematic cross-sectional views showing a method of inspecting a display apparatus according to an embodiment.

Referring to FIG. 13A, the pixel electrode 221, the first electrode E1, the second electrode E2, and the third electrode E3 may be formed on the substrate 100. The pixel electrode 221 may be formed in the display area DA. The first electrode E1 and the second electrode E2 may be formed in the first current inspection area CIA1. The third electrode E3 may be formed in the second current inspection area CIA2. The pixel electrode 221, the first electrode E1, the second electrode E2, and the third electrode E3 may include the same material and be formed by the same process.

Figure 13B:
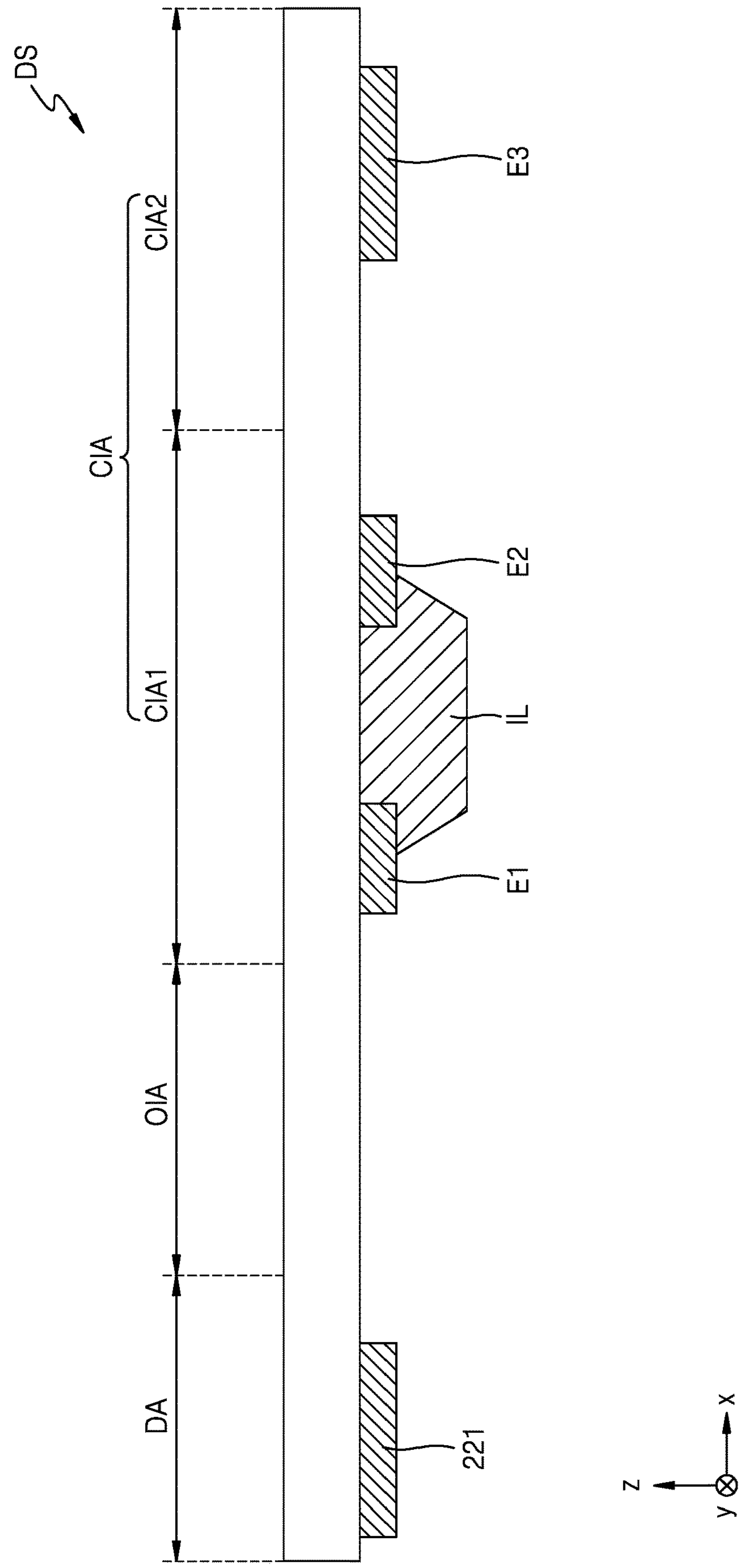

Referring to FIG. 13B, the insulating layer IL covering the first edge portion of the first electrode E1 and the second edge portion of the second electrode E2, may be formed.

Figure 13C:
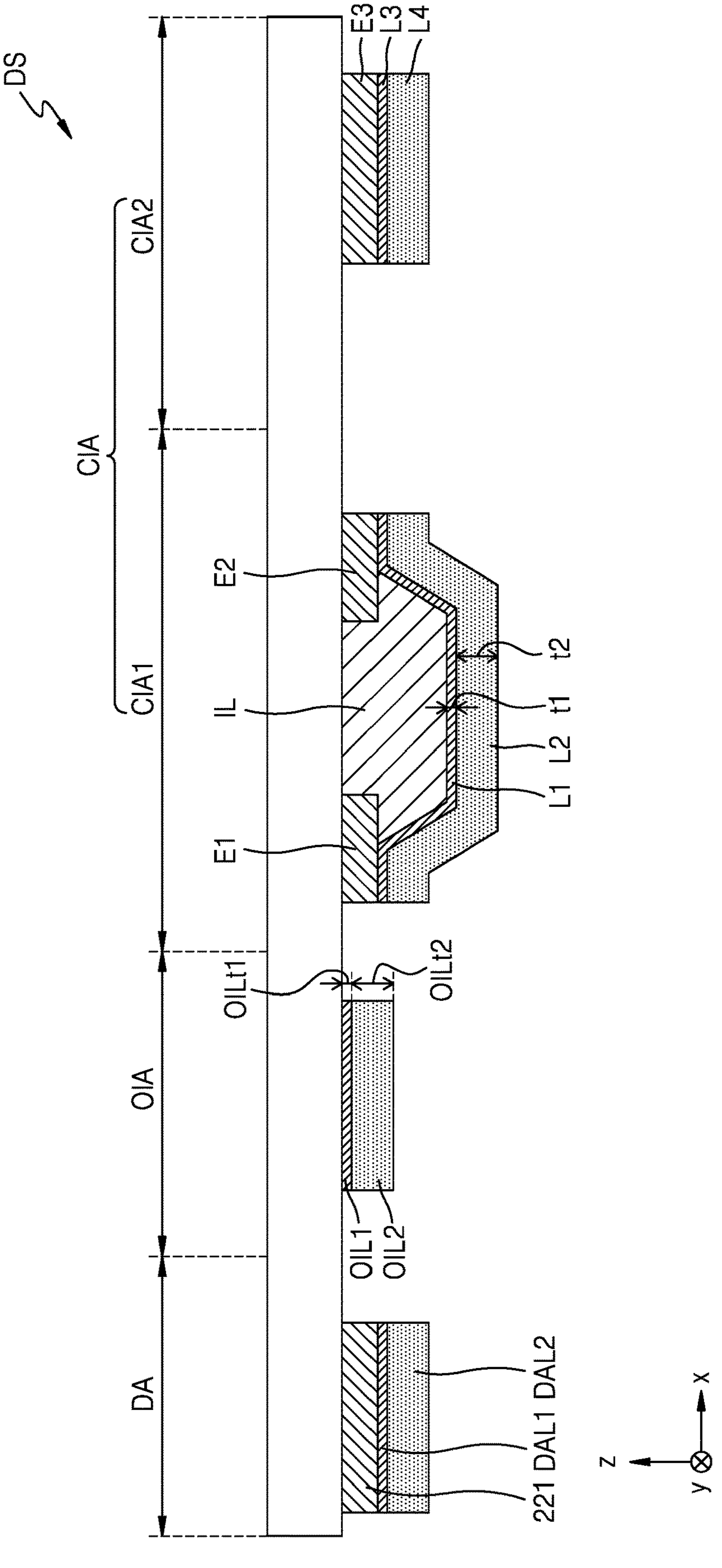

Referring to FIG. 13C, the first layer L1 may be disposed on the first electrode E1, the insulating layer IL, and the second electrode E2. The first layer L1 may contact (e.g., directly contact) the first electrode E1 and the second electrode E2. The third layer L3 may be formed on the third electrode E3. The first display area layer DAL1 may be formed on the pixel electrode 221. The first optical inspection layer OIL1 may be formed in the optical inspection area OIA. The first layer L1, the third layer L3, the first display area layer DAL1, and the first optical inspection layer OIL1 may have the same thickness. In an embodiment, the first layer L1, the third layer L3, the first display area layer DAL1, and the first optical inspection layer OIL1 may have the same doping concentration.

Each of the first layer L1, the third layer L3, the first display area layer DAL1 and the first optical inspection layer OIL1 may be a layer which is one of a hole injection layer, a hole transport layer, a negative charge-generating layer, a positive charge-generating layer, an electron injection layer, an emission layer, and an electron transport layer, and the layer may be doped with dopants. The first layer L1, the third layer L3, the first display area layer DAL1 and the first optical inspection layer OIL1 may include the same material and be formed by the same process.

The second layer L2 may be disposed on the first layer L1. The fourth layer L4 may be disposed on the third layer L3. The second display area layer DAL2 may be formed on the first display area layer DAL1. The second optical inspection layer OIL2 may be formed on the first optical inspection layer OIL1. The second layer L2, the fourth layer L4, the second display area layer DAL2, and the second optical inspection layer OIL2 may include the same material and be formed by the same process. The second layer L2, the fourth layer L4, the second display area layer DAL2, and the second optical inspection layer OIL2 may have the same thickness.

In an embodiment, in case that the first layer L1, the third layer L3, the first display area layer DAL1 and the first optical inspection layer OIL1 each are a first hole injection layer doped with p-type dopants, the second layer L2, the fourth layer L4, the second display area layer DAL2, and the second optical inspection layer OIL2 may each be a second hole injection layer including hosts.

The thickness t1 of the first layer L1 may be less than the thickness t2 of the second layer L2. The thickness of the third layer L3 may be less than the thickness of the fourth layer L4. The thickness of the first display area layer DAL1 may be less than the thickness of the second display area layer DAL2. A thickness OILt1 of the first optical inspection layer OIL1 may be less than a thickness OILt2 of the second optical inspection layer OIL2.

Figure 13D:
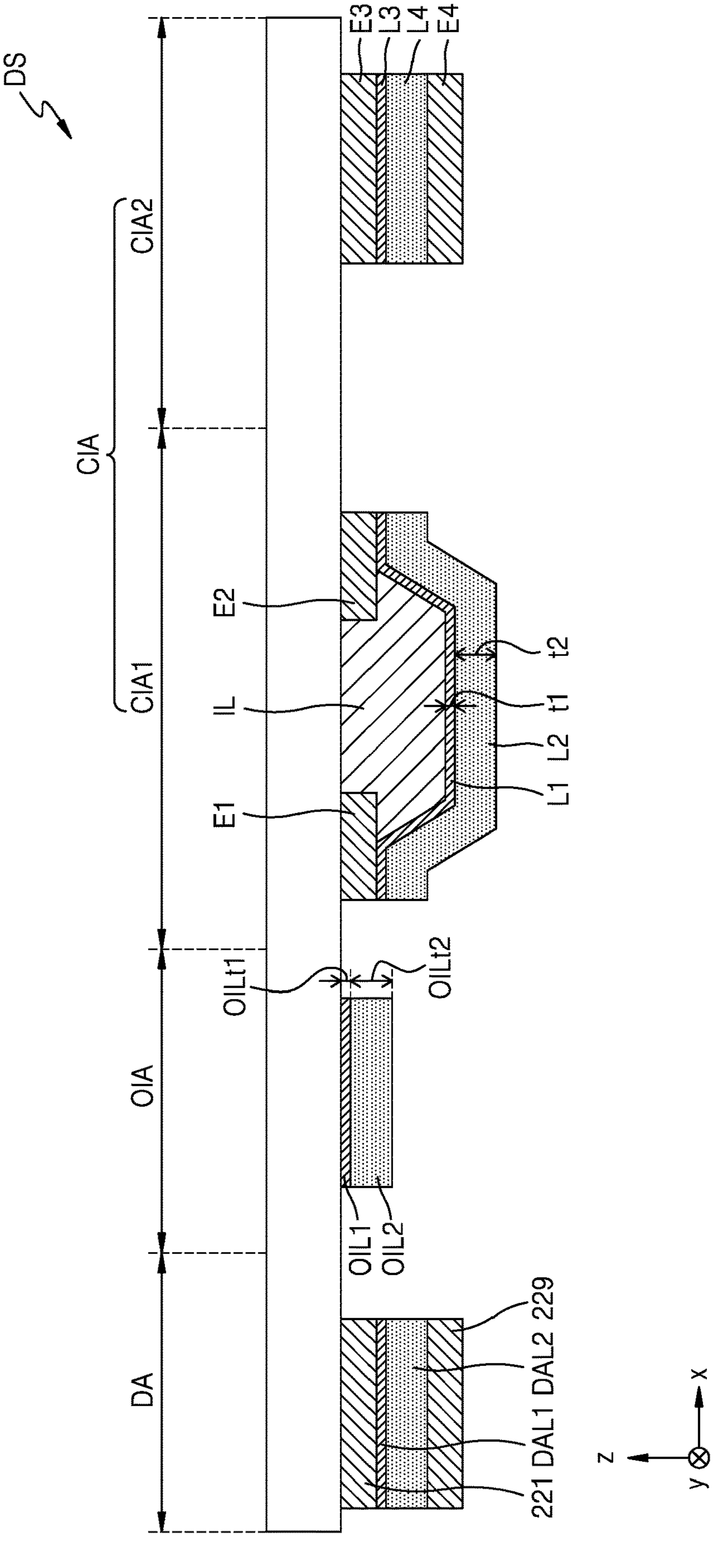

Referring to FIG. 13D, the fourth electrode E4 may be disposed on the fourth layer L4. The opposite electrode 229 may be disposed on the second display area layer DAL2. The fourth electrode E4 and the opposite electrode 229 may include the same material and be formed by the same process.

Figure 13E:
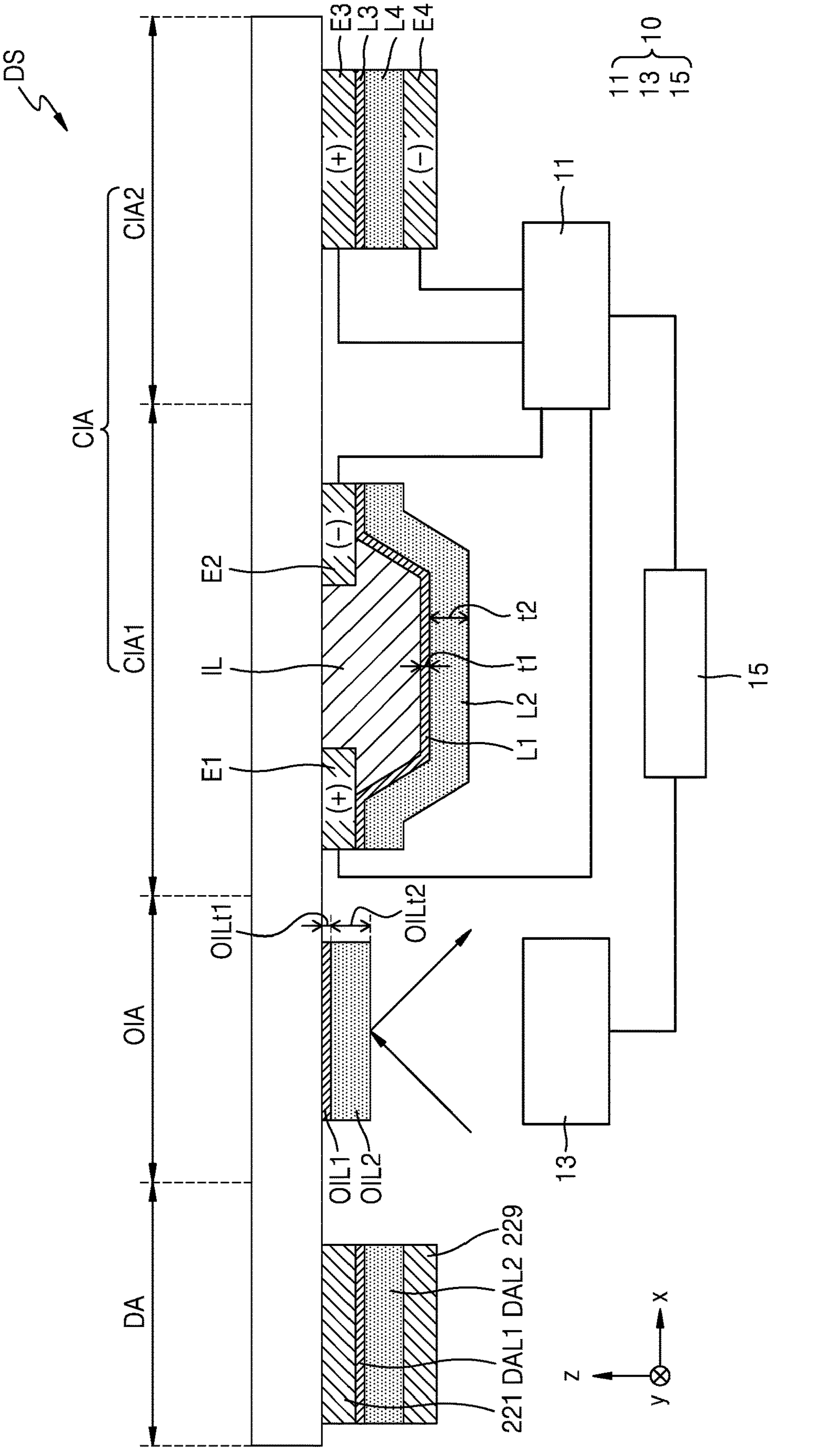

Referring to FIG. 13E, a first voltage and a second voltage may be respectively applied to the first electrode E1 and the second electrode E2, and a current value flowing through the first layer L1 may be measured. In an embodiment, the current inspector 11 may apply the first voltage and the second voltage to the first electrode E1 and the second electrode E2, and measure the current value flowing through the first layer L1. In an embodiment, because the current inspector 11 may apply the first voltage and the second voltage to the first electrode E1 and the second electrode E2, and measure the current value flowing through the first layer L1, the characteristic of the first layer L1 may be inspected.

In case that the first layer L1 includes dopants, the current inspector 11 may calculate the doping concentration of the first layer L1 based on the current value. As an example, in case that the first layer L1 is the first hole injection layer doped with p-type dopants, the current inspector 11 may calculate the doping concentration of the first layer L1 based on the current value.

A first voltage and a second voltage may be respectively applied to the third electrode E3 and the fourth electrode E4, and a current value flowing through the third layer L3 may be measured. In an embodiment, the current inspector 11 may apply the first voltage and the second voltage to the third electrode E3 and the fourth electrode E4, and measure the current value flowing through the third layer L3. As the current inspector 11 applies the first voltage and the second voltage to the third electrode E3 and the fourth electrode E4, and measure the current value flowing through the third layer L3, the characteristic of the third layer L3 may be inspected.

In case that the third layer L3 includes dopants, the current inspector 11 may calculate the doping concentration of the third layer L3 based on the current value. As an example, in case that the third layer L3 is the first hole injection layer doped with p-type dopants, the current inspector 11 may calculate the doping concentration of the third layer L3 based on the current value.

The doping concentration of the first display area layer DAL1 or the thickness of the first display area layer DAL1 may be determined as the measured doping concentrations or the measured thicknesses of the first layer L1 and the third layer L3 as the first layer L1, the third layer L3, and the first display area layer DAL1 are formed by the same process. Accordingly, it may be determined whether a display apparatus is properly or normally manufactured at a certain value.

As the apparatus 10 for inspecting the display apparatus measures a current value in each of the first current inspection area CIA1 and the second current inspection area CIA2 with respect to the first layer L1 and the third layer L3 formed by the same process, an inspection accuracy may be improved.

The thickness OILt2 of the second optical inspection layer OIL2 may be optically measured. In an embodiment, the optical inspector 13 may optically measure the thickness OILt2 of the second optical inspection layer OIL2. The light source may irradiate light toward the second optical inspection layer OIL2. The optical detector may detect light reflected by the second optical inspection layer OIL2.

The thickness of the second display area layer DAL2 may be determined as the measured thickness OILt2 of the second optical inspection layer OIL2 as the second display area layer DAL2 and the second optical inspection layer OIL2 may be formed by the same process. Accordingly, it may be determined whether a display apparatus is properly manufactured at a certain value.

In case that the apparatus 10 for inspecting the display apparatus includes the current inspector 11 and the optical inspector 13, a composite inspection may be performed. For example, an accuracy of the inspection may be improved.

In an embodiment, the second layer L2, the fourth layer L4, the second optical inspection layer OIL2, and the second display area layer DAL2 may be omitted. In case that the thickness of the first optical inspection layer OIL1 is about 100 Å or more, the optical inspector 13 may inspect the first optical inspection layer OIL1 and calculate the thickness OILt1 of the first optical inspection layer OIL1. For example, the current inspector 11 may inspect the first layer L1 and calculate the thickness t1 of the first layer L1. As the first layer L1 and the first optical inspection layer OIL1 are formed to have the same thickness, the current inspector 11 and the optical inspector 13 may be cross-verified with each other and the accuracy of inspection may be increased.

The apparatus 10 for inspecting the display apparatus may adjust a condition of a process of manufacturing the display apparatus by taking into account inspection results. The controller 15 may receive data from at least one of the current inspector 11 and the optical inspector 13. The data may be data regarding the inspection results. In an embodiment, the controller 15 may receive data regarding the calculated doping concentration of the first layer L1 from the current inspector 11. In an embodiment, the controller 15 may receive data regarding the calculated thickness t1 of the first layer L1 from the current inspector 11. The controller 15 may receive data regarding the thickness OILt2 of the second optical inspection layer OIL2 from the optical inspector 13.

The controller 15 may adjust a condition of the process of manufacturing the display apparatus by taking into account the data. In an embodiment, the controller 15 may adjust the condition of the process of manufacturing the display apparatus by taking into account the current value measured by the current inspector 11. In an embodiment, in case that the data is different from certain data, the controller 15 may adjust the condition of the process of manufacturing the display apparatus. As an example, the controller 15 may adjust temperature and/or pressure of a region in which the display substrate DS is arranged. Accordingly, the apparatus 10 for inspecting the display apparatus may inspect the display substrate DS in real-time during the process of manufacturing the display apparatus, and adjust the condition of the process of manufacturing the display apparatus. Accordingly, a defect of a manufactured display apparatus may be reduced.

For example, in case that the condition of the process of manufacturing the display apparatus is adjusted as described above, the hole injection layer doped with p-dopants may be formed at a certain value. Accordingly, a defect of the light-emitting element layer may be reduced. As the electron injection layer is formed at a certain value, defects of a touch sensor layer related to the electron injection layer and the opposite electrode may be reduced.

As described above, the method of inspecting the display apparatus according to an embodiment may provide (i.e., prepare) the display substrate including the first electrode, the second electrode, and the first layer each arranged in the current inspection area, respectively apply the first voltage and the second voltage to the first electrode and the second electrode, and measure a current value flowing through the first layer. For example, the method may calculate the doping concentration of the first layer based on the current value, or calculate the thickness of the first layer based on the current value during the process of manufacturing the display apparatus. Accordingly, it may be determined whether a display apparatus is properly manufactured at a certain value.

The apparatus 10 for inspecting the display apparatus 1 according to an embodiment may include the current inspector 11 and the optical inspector 13. During the process of manufacturing the display apparatus, the current inspector 11 may respectively apply the first voltage and the second voltage to the first electrode and the second electrode and measure a current value flowing through the first layer, and the optical inspector 13 may calculate the thickness of the second optical inspection layer arranged in the optical inspection area. The apparatus 10 for inspecting the display apparatus 1 may calculate the doping concentration or thickness of the first layer, and calculate the thickness of the second optical inspection layer. Accordingly, it may be determined whether a display apparatus is properly manufactured at a certain value.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A method of inspecting a display apparatus, the method comprising:
- providing a display substrate, the display substrate including:
  - a substrate including a display area and a current inspection area;
  - a first electrode and a second electrode that are disposed in the current inspection area and are apart from each other in a lengthwise direction of the substrate; and
  - a first layer disposed in the current inspection area and electrically connecting the first electrode to the second electrode;
- applying a first voltage and a second voltage to the first electrode and the second electrode, respectively; and
- measuring a current value flowing through the first layer.

2. The method of claim 1, further comprising calculating a doping concentration of dopants of the first layer based on the current value.

3. The method of claim 1, further comprising calculating a thickness of the first layer based on the current value.

4. The method of claim 1, wherein the providing of the display substrate includes:
- forming the first electrode and the second electrode in the current inspection area, the first electrode and the second electrode being apart from each other;
- forming an insulating layer covering a first edge portion of the first electrode and a second edge portion of the second electrode; and
- forming the first layer on the first electrode, the insulating layer, and the second electrode,
- wherein the first layer directly contacts the first electrode and the second electrode.

5. The method of claim 1, wherein
- the first electrode includes a plurality of first electrodes,
- the second electrode includes a plurality of second electrodes,
- the display substrate further includes a first pad and a second pad,
- the first pad is electrically connected to the plurality of first electrodes,
- the second pad is electrically connected to the plurality of second electrodes, and
- the current value flowing through the first layer is measured by applying the first voltage and the second voltage to the first pad and the second pad, respectively.

6. The method of claim 1, wherein
- the substrate further includes an optical inspection area,
- the display substrate further includes:
  - a second layer disposed on the first layer and having a thickness greater than a thickness of the first layer;
  - a first optical inspection layer disposed in the optical inspection area; and
  - a second optical inspection layer disposed on the first optical inspection layer and having a thickness greater than a thickness of the first optical inspection layer,
- the first layer and the first optical inspection layer include a same material,
- the second layer and the second optical inspection layer include a same material, and the method further includes optically measuring the thickness of the second optical inspection layer.

7. The method of claim 1, wherein
the substrate further includes an optical inspection area,
the display substrate further includes an optical inspection layer disposed in the optical inspection area, and
the method further includes optically measuring a thickness of the optical inspection layer.

8. The method of claim 1, wherein
the providing of the display substrate includes:
forming the first layer in the current inspection area; and
forming a first display area layer in the display area,
the first layer and the first display area layer include a same material, and
the method further includes adjusting a condition of a process of manufacturing the display apparatus based on the current value.

9. The method of claim 1, wherein the first layer includes at least one of a hole injection layer, a hole transport layer, a negative charge-generating layer, a positive charge-generating layer, an electron injection layer, an emission layer, and an electron transport layer.

10. A method of inspecting a display apparatus, the method comprising:
providing a display substrate including:
a substrate including a display area and a current inspection area;
a first electrode and a second electrode that are disposed in the current inspection area;
a first layer disposed in the current inspection area and electrically connecting the first electrode to the second electrode; and
a first display area layer disposed in the display area, the first display area layer and the first layer including a same material;
applying a first voltage and a second voltage to the first electrode and the second electrode, respectively;
measuring a current value flowing through the first layer; and
adjusting a condition of a process of manufacturing the display apparatus based on the current value,
wherein the first electrode, the first layer, and the second electrode are sequentially disposed in a thickness direction of the substrate.

11. An apparatus for inspecting a display apparatus including a display substrate, the display substrate including:
a substrate including a display area, a current inspection area, and an optical inspection area;
a first electrode and a second electrode that are disposed in the current inspection area;
a first layer disposed in the current inspection area and electrically connecting the first electrode to the second electrode;
a first optical inspection layer disposed in the optical inspection area, the first optical inspection layer and the first layer including a same material, and
a second optical inspection layer disposed on the first optical inspection layer,
the apparatus for inspecting the display apparatus comprising:
a current inspector including:
a first module including:
a first contact probe that is electrically connected to the first electrode; and
a second contact probe that is electrically connected to the second electrode, and
a first processor that processes current data transferred from the first module; and
an optical inspector including:
a second module including:
a light source that irradiates light toward the second optical inspection layer, and
an optical detector that detects light reflected by the second optical inspection layer; and
a second processor that processes optical data of the reflected light transferred from the second module.

12. The apparatus of claim 11, wherein
the current inspector is configured to apply a first voltage and a second voltage to the first electrode and the second electrode, respectively, and to measure a current value flowing through the first layer, and
the first processor is configured to calculate a doping concentration of dopants of the first layer based on the current value.

13. The apparatus of claim 11, wherein
the current inspector is configured to apply a first voltage and a second voltage to the first electrode and the second electrode, respectively, and to measure a current value flowing through the first layer, and
the first processor is configured to calculate a thickness of the first layer based on the current value.

14. The apparatus of claim 11, wherein
the first electrode is apart from the second electrode in a lengthwise direction of the substrate,
the display substrate further includes an insulating layer covering a first edge portion of the first electrode and a second edge portion of the second electrode, and
the first layer is disposed on the first electrode, the insulating layer, and the second electrode, and directly contacts the first electrode and the second electrode.

15. The apparatus of claim 11, wherein the first electrode, the first layer, and the second electrode are sequentially stacked in a thickness direction of the substrate.

16. The apparatus of claim 11, wherein
a thickness of the second optical inspection layer is greater than a thickness of the first optical inspection layer, and
the second processor is configured to calculate the thickness of the second optical inspection layer based on the optical data.

17. The apparatus of claim 11, further comprising:
a controller that receives data from at least one of the current inspector and the optical inspector, wherein
the display substrate includes a first display area layer disposed in the display area, the first display area layer and the first layer that include a same material, and
the controller is further configured to adjust a condition of a process of manufacturing the display apparatus based on the data.

18. The apparatus of claim 11, wherein the first layer includes at least one of a hole injection layer, a hole transport layer, a negative charge-generating layer, a positive charge-generating layer, an electron injection layer, an emission layer, and an electron transport layer.

19. The apparatus of claim 11, wherein the first module is movable in one of a first direction, a second direction perpendicular to the first direction, and a third direction perpendicular to the first direction and the second direction.

20. The apparatus of claim 11, wherein the second module is movable in one of a first direction, a second direction perpendicular to the first direction, and a third direction perpendicular to the first direction and the second direction.

* * * * *